(12) United States Patent
Oishi et al.

(10) Patent No.: US 11,548,790 B2
(45) Date of Patent: Jan. 10, 2023

(54) PROCESSES FOR PREPARING INORGANIC CARBONATES

(71) Applicant: NIPPON PAPER INDUSTRIES CO., LTD., Tokyo (JP)

(72) Inventors: Masatoshi Oishi, Tokyo (JP); Toru Nakatani, Tokyo (JP); Moe Fukuoka, Tokyo (JP); Shisei Goto, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 808 days.

(21) Appl. No.: 16/330,439

(22) PCT Filed: Sep. 4, 2017

(86) PCT No.: PCT/JP2017/031687
§ 371 (c)(1),
(2) Date: Mar. 5, 2019

(87) PCT Pub. No.: WO2018/047749
PCT Pub. Date: Mar. 15, 2018

(65) Prior Publication Data
US 2021/0276878 A1 Sep. 9, 2021

(30) Foreign Application Priority Data

Sep. 7, 2016 (JP) .............................. JP2016-174759

(51) Int. Cl.
*C01F 11/18* (2006.01)
*D06M 11/76* (2006.01)

(52) U.S. Cl.
CPC ............ *C01F 11/181* (2013.01); *D06M 11/76* (2013.01); *C01P 2004/64* (2013.01); *D10B 2201/00* (2013.01)

(58) Field of Classification Search
CPC ...... D21H 17/70; D21H 17/67; D21H 17/675; B01F 3/04; B01F 5/02; B01F 5/12;
(Continued)

(56) References Cited

U.S. PATENT DOCUMENTS 10,112,844 B2 10/2018 Fukuoka et al.
2007/0169905 A1 7/2007 Yamashita et al.
2013/0312925 A1* 11/2013 Saastamoinen ......... C01F 11/18
162/175

FOREIGN PATENT DOCUMENTS

EP 3127868 A1 2/2017
JP H10-72215 A 3/1998
(Continued)

OTHER PUBLICATIONS

C. Wu et al., Generation and characterization of submicron size bubbles, Advances in Colloid and Interface Science, 2012, 179-182, 123-132 (Year: 2012).*

(Continued)

*Primary Examiner* — Coris Fung
*Assistant Examiner* — Keling Zhang
(74) *Attorney, Agent, or Firm* — McCarter & English, LLP; Steven G. Davis; Wei Song

(57) ABSTRACT

The present invention aims to provide techniques for efficiently synthesizing inorganic microparticles. According to the present invention, inorganic carbonate microparticles can be synthesized by generating ultrafine bubbles containing carbonic acid gas by injecting a gas containing carbonic acid gas and a liquid into a reaction vessel through a nozzle to deposit an inorganic carbonate having an average primary particle size of 300 nm or less in the presence of the ultrafine bubbles.

18 Claims, 11 Drawing Sheets

(58) Field of Classification Search
CPC ......... B01F 5/00; D06M 11/76; C01F 11/181; C01F 11/182; C01F 5/24; C09C 1/021; C01P 2004/64
USPC .......................................................... 423/430
See application file for complete search history.

(56) References Cited

FOREIGN PATENT DOCUMENTS

| JP | 2003-246617 A | 9/2003 |
| JP | 2007-254193 A | 10/2007 |
| JP | 2011-73891 A | 4/2011 |
| JP | 2011-73892 A | 4/2011 |
| JP | 2014-217803 A | 11/2014 |
| JP | 2015-199654 A | 11/2015 |
| JP | 2015-199659 A | 11/2015 |
| WO | 2004/108597 A1 | 12/2004 |
| WO | 2015/152283 A1 | 10/2015 |

OTHER PUBLICATIONS

B. Han et al., Mechanistic study of magnesium carbonate semibatch reactive crystallization with magnesium hydroxide and CO2 (Year: 2014).*
M. Ciobanu et. al., In-situ cellulose fibers loading with calcium carbonate precipitated by different methods, Cellulose Chem. Technol., 2010, 44 (9), 379-387 (Year: 2010).*
European Office Action for Application No. 17848689.0, dated Apr. 22, 2020, 7 pages.
Bang et al., Effects of CO2 Bubble Size, CO2 Flow Rate and Calcium Source on the Size and Specific Surface Area of CaCO3 Particles. Energies. Oct. 27, 2015;8:12304-12313.
Bang Precipitation of calcium carbonate by carbon dioxide microbubbles Chemical Engineering Journal. 2011;174:413-420.
Matsumoto et al., Recovery and Upgrading of Magnesium for Utilization of Seawater Resources—Reactive Crystallization of Magnesium Carbonate by CO2 Minute-bubble Injection into Ca2+ Removed Brine. Bull Soc Sea Water Sci Jpn. 2015;69:262-269.
International Search Report for Application No. PCT/JP2017/031687, dated Oct. 24, 2017, 2 pages.

* cited by examiner

Reaction solution          Pumped water

PRIOR ART

PROCESSES FOR PREPARING INORGANIC CARBONATES

CROSS-REFERENCE TO RELATED APPLICATIONS

This application is a U.S. national stage filing, under 35 U.S.C. § 371(c), of International Application No. PCT/JP2017/031687, filed on Sep. 4, 2017, which claims priority to Japanese Patent Application No. 2016-174759, filed on Sep. 7, 2016. The entire contents of each of the aforementioned applications are incorporated herein by reference.

TECHNICAL FIELD

The present invention relates to processes for preparing inorganic carbonates such as calcium carbonate. In particular, the present invention relates to processes for preparing small-particle size inorganic particles having an average primary particle size of 300 nm or less.

BACKGROUND ART

In general, calcium carbonate is mainly classified into "natural calcium carbonate" prepared by mechanically grinding and classifying natural limestone, weathered shell or the like and "synthetic calcium carbonate" (precipitated calcium carbonate) prepared by chemically reacting limestone. Known processes for synthesizing the synthetic calcium carbonate include the carbonation process, the lime-soda process, and the Solvay process, among which the carbonation process is typically employed for the industrial synthesis of calcium carbonate while the use of the lime-soda process and the Solvay process is limited to special applications.

Synthesis of calcium carbonate by the carbonation process involves reacting quick lime and carbonic acid gas, and typically comprises a slaking step in which water is added to quick lime CaO to give slaked lime $Ca(OH)_2$, and a carbonation step in which carbonic acid gas $CO_2$ is injected into the slaked lime to give calcium carbonate $CaCO_3$. Currently, various techniques for controlling the particle shape or particle size or the like of the product calcium carbonate by regulating reaction conditions of the steps of synthesizing calcium carbonate, especially the carbonation step have been proposed.

For example, PTLs 1 and 2 describe controlling the morphology or the like of calcium carbonate by adding a chelating agent during the carbonation step. Thus, PTL 1 proposes a process for preparing calcium carbonate with good dispersibility and little secondary aggregation by adding a material capable of forming a complex with metal ions during the carbonation reaction. On the other hand, PTL 2 proposes a process for preparing calcium carbonate having uniform mesopores by adding a sequestering agent at multiple stages during the carbonation step. Additionally, PTL 3 proposes controlling the shape of calcium carbonate by performing the carbonation reaction in two stages under specific conditions.

Further, PTLs 4 and 5 describe techniques for preparing calcium carbonate by supplying a suspension containing slaked lime and a gas containing carbon dioxide to a reactor while mixing them using an injector. In addition, PTLs 5 and 6 describe preparing calcium carbonate having a small particle size by the carbonation process in the presence of bubbles.

CITATION LIST

Patent Literature

PTL 1: JPA 1998-72215
PTL 2: JPA 2003-246617
PTL 3: International Publication WO2004/108597
PTL 4: JPA 2011-073891
PTL 5: JPA 2011-073892
PTL 6: JPA 2015-199654
PTL 7: JPA 2015-199659

SUMMARY OF INVENTION

Technical Problem

The present invention aims to provide techniques for efficiently preparing inorganic carbonates having a small primary particle size.

Solution to Problem

As a result of careful studies about the problems described above, we found that inorganic carbonates having a small primary particle size can be prepared efficiently by synthesizing inorganic particles by the carbonation process in the presence of ultrafine bubbles (having an average particle size of 1000 nm or less) generated under relatively mild conditions. Particularly, the inorganic particles obtained according to the present invention have a very uniform shape with little variations between products.

Thus, the present invention includes, but not limited to, the following:

(1) A process for preparing an inorganic carbonate, comprising generating ultrafine bubbles containing carbonic acid gas by injecting a gas containing carbonic acid gas and a liquid into a reaction vessel through a nozzle to deposit an inorganic carbonate having an average primary particle size of 300 nm or less in the presence of the ultrafine bubbles.
(2) The process as defined in (1), wherein the ultrafine bubbles have an average particle size of 1 to 800 nm.
(3) The process as defined in (1) or (2), wherein the average duration from the generation of the ultrafine bubbles to the disappearance of the ultrafine bubbles is 10 seconds or more.
(4) The process as defined in any one of (1) to (3), wherein the inorganic carbonate is calcium carbonate.
(5) The process as defined in any one of (1) to (3), wherein the inorganic carbonate is magnesium carbonate.
(6) The process as defined in any one of (1) to (5), comprising depositing an inorganic carbonate on a fiber in the presence of the fiber.
(7) The process as defined in any one of (1) to (6), wherein the fiber is a cellulose fiber.

Advantageous Effects of Invention

According to the present invention, inorganic carbonates such as calcium carbonate can be prepared efficiently in a short time with low power consumption by using ultrafine bubbles (submicron bubbles having an average particle size of 1000 nm or less) containing carbonic acid gas.

The reason why inorganic carbonates such as calcium carbonate microparticles can be prepared efficiently by synthesizing inorganic particles according to the present invention is not known in detail, but can be explained by the following assumption though the present invention is not bound to it. That is, it is assumed that inorganic carbonates can be prepared with good efficiency because ultrafine bubbles have a long residence time in the system and a high specific surface area enough that reaction occurs efficiently on their surfaces.

BRIEF DESCRIPTION OF DRAWINGS

FIG. 4-1 is a schematic diagram showing an example of a reaction system that can be used in the present invention (a reaction system wherein a liquid and carbonic acid gas are injected from the outside of the reaction vessel).

FIG. 4-2 is a schematic diagram showing an example of a reaction system that can be used in the present invention (a reaction system wherein a liquid and carbonic acid gas are injected from the outside of the reaction vessel).

FIG. 4-3 is a schematic diagram showing an example of a reaction system that can be used in the present invention (a reaction system wherein a liquid and carbonic acid gas are injected from the outside of the reaction vessel).

DESCRIPTION OF EMBODIMENTS

Figure 1:
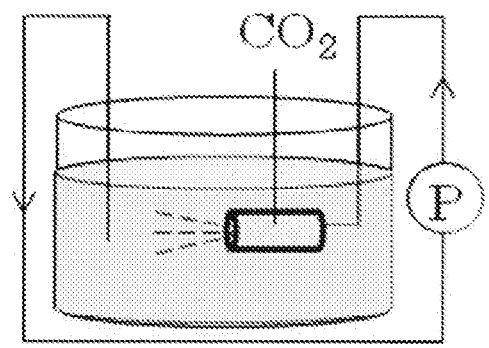
FIG. 1 is a schematic diagram showing a reaction system used in Experiment 1 (Sample 1-1 to Sample 1-4).

In the present invention, inorganic carbonates are synthesized in the presence of ultrafine bubbles containing carbonic acid gas.

Inorganic Carbonates

The preparation processes of the present invention make it possible to efficiently prepare inorganic carbonates such as calcium carbonate and magnesium carbonate. The average primary particle size of the inorganic carbonate microparticles obtained by the present invention is less than 300 nm, or can be less than 200 nm. On the other hand, the average primary particle size of the calcium carbonate microparticles can be 10 nm or more.

The inorganic carbonates obtained by the present invention can be used for various applications including, for example, papers, fibers, cellulosic composite materials, filter materials, paints, plastics and other resins, rubbers, elastomers, ceramics, glasses, tires, construction materials (asphalt, asbestos, cement, boards, concrete, bricks, tiles, plywoods, fiber boards and the like), various carriers (catalyst carriers, drug carriers, agrochemical carriers, microbial carriers and the like), adsorbents (decontaminants, deodorants, dehumidifying agents and the like), anti-wrinkle agents, clays, abrasives, modifiers, repairing materials, thermal insulation materials, heat resistant materials, heat dissipation materials, damp proofing materials, water repellent materials, waterproofing materials, light shielding materials, discoloration inhibitors, sealants, shielding materials, insect repellents, adhesives, inks, cosmetic materials, medical materials, paste materials, food additives, tablet excipients, dispersants, structuring agents, water retention agents, filter aids, oil rectification additives, oil processing additives, oil reforming additives, electromagnetic wave absorbers, insulating materials, acoustic insulation materials, vibration damping materials, semiconductor sealing materials, radiation shielding materials, cosmetics, sanitary products, fertilizers, feedstuffs, perfumes, additives for paints, adhesives and resins, discoloration inhibitors, electrically conductive materials, thermally conductive materials, flame retardant materials, sanitary materials, antibacterial materials, freshness retainers, etc., thus they can be widely used for any applications. They also can be used for various fillers, coating agents and the like in the applications mentioned above. Among others, the inorganic carbonates of the present invention are readily applied for papermaking purposes including, for example, printing papers, newsprint papers, inkjet printing papers, PPC papers, kraft papers, woodfree papers, coated papers, coated fine papers, wrapping papers, thin papers, colored woodfree papers, cast-coated papers, carbonless copy papers, label papers, heat-sensitive papers, various fancy papers, water-soluble papers, release papers, process papers, hanging base papers, incombustible papers, flame retardant papers, base papers for laminated boards, battery separators, cushion papers, tracing papers, impregnated papers, papers for ODP, building papers, papers for decorative building materials, envelope papers, papers for tapes, heat exchange papers, chemical fiber papers, aseptic papers, water resistant papers, oil resistant papers, heat resistant papers, photocatalytic papers, cosmetic papers (facial blotting papers and the like), various sanitary papers (toilet papers, facial tissues, wipers, diapers, menstrual products and the like), cigarette rolling papers, paperboards (liners, corrugating media, white paperboards and the like), base papers for paper plates, cup papers, baking papers, abrasive papers, synthetic papers and the like. Thus, the present invention makes it possible to provide carbonate microparticles having a small particle size and a narrow particle size distribution so that they may have different properties from those of conventional carbonates for papermaking having a particle size of more than 1 μm.

Further, the inorganic carbonates obtained by the present invention can be used in combination with particles commonly known as inorganic fillers and organic filler or various fibers. For example, inorganic fillers include calcium carbonate (precipitated calcium carbonate, ground calcium carbonate), magnesium carbonate, barium carbonate, aluminum hydroxide, calcium hydroxide, magnesium hydroxide, zinc hydroxide, clay (kaolin, calcined kaolin, delaminated kaolin), talc, zinc oxide, zinc stearate, titanium dioxide, silica-containing products prepared from sodium silicate and a mineral acid (white carbon, silica/calcium carbonate complexes, silica/titanium dioxide complexes), terra alba, bentonite, diatomaceous earth, calcium sulfate, zeolite, inorganic fillers recycled from ash obtained in a deinking process and inorganic fillers consisting of complexes formed with silica or calcium carbonate during the recycling process, etc. In addition to calcium carbonate-silica complexes such as calcium carbonate and/or precipitated calcium carbonate-silica complexes, amorphous forms of silica such as white carbon can also be used. Organic fillers include urea-formaldehyde resins, polystyrene resins, phenol resins, hollow microparticles, acrylamide complexes, wood-derived materials (microfibers, microfibrillar fibers, kenaf powders), modified/insolubilized starches, ungelatinized starches and the like.

The average particle size or shape or the like of the inorganic carbonates obtained by the present invention can be identified by electron microscopic observation. Further, the product inorganic carbonates can also be qualitatively identified from the viscosity or the like of the reaction slurry.

Further, the inorganic carbonates such as calcium carbonate obtained by the present invention preferably have, for example, a BET specific surface area of 1 to 100 $m^2/g$, more preferably 20 to 100 $m^2/g$. In one embodiment, it may be 10 to 40 $m^2/g$. Further, the inorganic carbonates such as calcium carbonate obtained by the present invention preferably have an oil absorption value of 50 to 250 mL/100 g in one embodiment, more preferably 80 to 250 mL/100 g. It should be noted that the particle size and specific surface area of the inorganic carbonates obtained by the present invention can be controlled by grinding or the like, such as wet or dry grinding using a bead mill, processing using a high pressure homogenizer, ultrasonic dispersion or the like, for example.

Further, the inorganic carbonates obtained by the present invention may take the form of secondary particles resulting from the aggregation of fine primary particles, wherein the secondary particles can be produced to suit the intended purpose or can be produced by breaking down aggregates by grinding. Grinding means include ball mills, sand grinder mills, impact mills, high Dyno pressure homogenizers, low pressure homogenizers, Dyno mills, ultrasonic mills, Kanda grinders, attritors, millstone type mills, vibration mills, cutter mills, jet mills, disintegrators, beaters, single screw extruders, twin screw extruders, ultrasonic stirrers, juicers/mixers for home use, etc.

The inorganic carbonates obtained by the present invention can be used in various shapes including, for example, powders, pellets, moldings, aqueous suspensions, pastes, sheets and other shapes. Further, magnesium carbonate can be used as a major component with other materials to form molded products such as moldings and particles or pellets. The dryer used to dry them to form powder is not specifically limited either, but air stream dryers, band dryers, spray dryers and the like can be suitably used, for example.

In the present invention, carbonate microparticles having various sizes or shapes can be complexed with a fiber by controlling the conditions under which the inorganic carbonates are synthesized.

Ultrafine Bubbles Containing Carbonic Acid Gas

In the present invention, inorganic particles such as calcium carbonate or magnesium carbonate are synthesized in the presence of ultrafine bubbles (submicron bubbles having an average particle size of 1000 nm or less, UFB) containing carbonic acid gas. In the present invention, the ultrafine bubbles containing carbonic acid gas are generated by injecting a gas containing carbonic acid gas and a liquid into a reaction vessel, and the average particle size of the ultrafine bubbles is not specifically limited so far as it is 1000 nm or less, preferably 1 to 800 nm, more preferably 10 to 500 nm, or may be 50 to 300 nm. In the present invention, cavitation bubbles need not be generated by injecting a liquid under high pressure so that inorganic particles such as calcium carbonate can be synthesized without high energy consumption.

Further, the ultrafine bubbles containing carbonic acid gas can preferably stay in the system for 10 seconds or more, more preferably 60 seconds or more until the ultrafine bubbles disappear after the ultrafine bubbles are generated. Especially, the ultrafine bubbles according to the present invention can still more preferably stay in the system for 5 minutes or more, especially preferably 15 minutes or more, or may stay for 60 minutes or more. If the ultrafine bubbles can stay in the system over a long period of time, the bubbles containing carbonic acid gas can stay in the reaction solution over a long period of time so that inorganic carbonate microparticles can be prepared efficiently.

The ultrafine bubbles can be generated by known preparation processes. For example, they can be prepared by applying a shear force by gas-liquid mixing, by the use of a static mixer, by the use of a venturi tube, by cavitation, by vapor condensation, by ultrasound, by the use of a swirling jet, by dissolution under pressure, through micropores or the like. Among them, the use of a shear force by gas-liquid mixing and the use of a swirling jet are preferred because ultrafine bubbles can be easily generated by using a pump or the like. In preferred embodiments, carbon dioxide can be supplied through an intake port by natural intake (self-priming).

The term "cavitation" refers to a physical phenomenon in which bubbles are generated and disappear in the flow of a fluid in a short time due to a pressure difference. The bubbles generated by cavitation (cavitation bubbles) develop from very small "bubble nuclei" of 100 μm or less present in a liquid when the pressure drops below the saturated vapor pressure in the fluid only for a very short period of time. Cavitation bubbles can be generated in a reaction vessel by known methods, but conventional methods required high energy and could not be said to be efficient. For example, it is possible to generate cavitation bubbles by injecting a fluid under high pressure, or by stirring at high speed in a fluid, or by causing an explosion in a fluid, or by using an ultrasonic vibrator (vibratory cavitation) or the like.

In the present invention, the reaction solution of a raw material or the like can be directly used as a jet liquid to generate ultrafine bubbles, or some fluid can be injected into the reaction vessel to generate ultrafine bubbles. The fluid forming a liquid jet may be any of a liquid, a gas, or a solid such as powder or pulp or a mixture thereof so far as it is in a flowing state. Moreover, another fluid such as carbonic acid gas can be added as an additional fluid to the fluid described above, if desired. The fluid described above and the additional fluid may be injected as a homogeneous mixture or may be injected separately.

The term "liquid jet" refers to a jet of a liquid or a fluid containing solid particles or a gas dispersed or mixed in a liquid, such as a liquid jet containing a pulp or a slurry of inorganic particles or bubbles. In the present invention, it may contain bubbles containing carbonic acid gas.

The ultrafine bubbles can be generated by using known devices, and when bubbles are generated by emitting a jetting liquid through a nozzle or an orifice tube, for example, the pressure at the site where it is emitted from the nozzle into the reaction vessel (P1, herein also referred to as upstream pressure) is not specifically limited, but preferably 0.05 to 4.5 MPa, for example. In another embodiment, the pressure P1 can be 5 MPa or more and 10 MPa or less. If the upstream pressure is less than 0.01 MPa, little benefit is attained because a pressure difference is less likely to occur from the pressure at the outlet of the reaction vessel (P2, herein also referred to as downstream pressure). If the upstream pressure is higher than 30 MPa, a special pump and pressure vessel are required and energy consumption increases, leading to cost disadvantages. On the other hand, the pressure at the outlet of the reaction vessel (P2) is preferably 0.005 MPa or more and 0.9 MPa or less expressed in static pressure. Further, the ratio between the pressure in the vessel and the pressure of the jetting liquid (P2/P1) is preferably in the range of 0.001 to 0.5. It should be noted that the pressure (dynamic pressure) can be measured by using a pressure gauge.

The flow rate at which a gas containing carbonic acid gas and a liquid are emitted from the nozzle is preferably 100 to 640 L/min·cm$^2$, or may be 100 to 300 L/min·cm$^2$. The jet flow rate of the jetting liquid is desirably in the range of 1 m/sec or more and 200 m/sec or less, preferably in the range of 20 m/sec or more and 100 m/sec or less. If the jet flow rate is less than 1 m/sec, little benefit is attained because the pressure drop is too small to generate ultrafine bubbles. If it is greater than 200 m/sec, however, special equipment is required to generate high pressure, leading to cost disadvantages.

In the present invention, bubbles may be generated in a reaction vessel where a reaction occurs by the carbonation process. The process can be run in one pass, or can be run through a necessary number of cycles. Further, the process can be run in parallel or in series using multiple generating means.

Liquid emission may take place in a vessel open to the atmosphere, but preferably takes place within a closed pressure vessel.

When ultrafine bubbles are generated by liquid emission, the solids content of the aqueous suspension of slaked lime forming the reaction solution is preferably 30% by weight or less, more preferably 20% by weight or less. This is because bubbles are more likely to homogeneously act on the reaction system at such levels. Further, the solids content of the aqueous suspension of slaked lime forming the reaction solution is preferably 0.1% by weight or more to improve the reaction efficiency.

In the present invention, the pH of the reaction solution is basic at the beginning of the reaction, but changes to neutral as the carbonation reaction proceeds. Thus, the reaction can be controlled by monitoring the pH of the reaction solution.

In the present invention, the reaction temperature is preferably 0° C. or more and 90° C. or less, especially preferably 10° C. or more and 60° C. or less. Given that the impact force is generally thought to be maximal at the midpoint between the melting point and the boiling point, the temperature is suitably around 50° C. in cases of aqueous solutions, though significant benefits can be obtained even at lower temperatures within the ranges defined above because there is no influence of vapor pressure.

In the present invention, the energy required for generating ultrafine bubbles can be reduced by adding a surfactant. Surfactants that may be used include known or novel surfactants, e.g., nonionic surfactants, anionic surfactants, cationic surfactants and amphoteric surfactants such as fatty acid salts, higher alkyl sulfates, alkyl benzene sulfonates, higher alcohols, alkyl phenols, alkylene oxide adducts of fatty acids and the like. These may be used alone or as a mixture of two or more components. They may be added in any amount necessary for lowering the surface tension of the jetting liquid and/or target liquid.

Synthesis of Calcium Carbonate

In cases where calcium carbonate microparticles are synthesized in the presence of fine bubbles containing carbonic acid gas in the present invention, a known method can be used for synthesizing calcium carbonate. For example, calcium carbonate can be synthesized by the carbonation process, the soluble salt reaction process, the lime-soda process, the Solvay process or the like, and in preferred embodiments, calcium carbonate is synthesized by the carbonation process.

When calcium carbonate is to be prepared by the carbonation process, lime is typically used as a calcium source to synthesize calcium carbonate via a slaking step in which water is added to quick lime CaO to give slaked lime Ca(OH)$_2$ and a carbonation step in which carbonic acid gas CO$_2$ is injected into the slaked lime to give calcium carbonate CaCO$_3$. During then, the suspension of slaked lime prepared by adding water to quick lime may be passed through a screen to remove less soluble lime particles contained in the suspension. Alternatively, slaked lime may be used directly as a calcium source. In cases where calcium carbonate is synthesized by the carbonation process in the present invention, the carbonation reaction may be performed in the presence of ultrafine bubbles containing carbonic acid gas.

Typically known reaction vessels for preparing calcium carbonate by the carbonation process (carbonation reactors or carbonators) include gas injection carbonators and mechanically stirred carbonators. The gas injection carbonators inject carbonic acid gas into a carbonation reactor containing a suspension of slaked lime (milk of lime) to react the slaked lime with the carbonic acid gas, but it is difficult to uniformly and precisely control the size of bubbles simply by injecting carbonic acid gas, which imposes limitations in terms of the reaction efficiency. On the other hand, the mechanically stirred carbonators are equipped with a stirrer inside the carbonators and introduce carbonic acid gas near the stirrer, thereby dispersing the carbonic acid gas as fine bubbles to improve the efficiency of the reaction between the slaked lime and the carbonic acid gas ("Handbook of Cement, Gypsum and Lime" published by GIHODO SHUPPAN Co., Ltd., 1995, page 495).

If the reaction solution had a high concentration or the carbonation reaction advanced in cases where stirring took place with a stirrer provided within a carbonation reactor as in mechanically stirred carbonators, however, the resistance of the reaction solution increased to make it difficult to sufficiently stir it and therefore make it difficult to exactly control the carbonation reaction or the stirrer was subjected to a considerable load for sufficient stirring, thus leading to energy disadvantages. Further, a gas injection port is located at a lower site of the carbonator, and blades of the stirrer are provided near the bottom of the carbonator to allow better stirring. Less soluble lime screen residues rapidly precipitate and always stay at the bottom, thereby blocking the gas injection port or disturbing the balance of the stirrer. Moreover, conventional methods required not only a carbonator but also a stirrer and equipment for introducing carbonic acid gas into the carbonator, which also incurred much costs of equipment. In the mechanically stirred carbonators, the carbonic acid gas supplied near the stirrer is dispersed as fine bubbles by the stirrer to improve the efficiency of the reaction between the slaked lime and the carbonic acid gas, but the carbonic acid gas could not be dispersed as sufficiently fine bubbles if the concentration of the reaction solution was high or in other cases and it was also sometimes difficult to precisely control the morphology or the like of the produced calcium carbonate in the carbonation reaction. In the present invention, calcium carbonate is synthesized in the presence of bubbles containing carbonic acid gas, whereby the carbonation reaction proceeds efficiently and uniform calcium carbonate microparticles can be prepared. Especially, the use of a jet allows sufficient stirring without any mechanical stirrer such as blades. In the present invention, previously known reaction vessels can be used, including the gas injection carbonators and the mechanically stirred carbonators as described above without any inconveniences as a matter of course, and these vessels may be combined with a jet using a nozzle or the like.

When calcium carbonate is synthesized by the carbonation process, the aqueous suspension of slaked lime preferably has a solids content in the order of 0.1 to 40% by weight, more preferably 0.5 to 30% by weight, still more preferably 1 to 20% by weight. If the solids content is low, the reaction efficiency decreases and the production cost increases, but if the solids content is too high, the flowability decreases and the reaction efficiency decreases. In the present invention, calcium carbonate is synthesized in the presence of ultrafine bubbles so that the reaction solution and carbonic acid gas can be suitably mixed even if a suspension (slurry) having a high solids content is used.

The aqueous suspension containing slaked lime that can be used includes those commonly used for the synthesis of calcium carbonate, and can be prepared by, for example, mixing slaked lime with water or by slaking (digesting) quick lime (calcium oxide) with water. The slaking conditions include, but not specifically limited to, a CaO concentration of 0.1% by weight or more, preferably 1% by weight or more, and a temperature of 20 to 100° C., preferably 30 to 100° C., for example. Further, the average residence time in the slaking reactor (slaker) is not specifically limited either, but can be, for example, 5 minutes to 5 hours, preferably 2 hours or less. It should be understood that the slaker may be batch or continuous. It should be noted that, in the present invention, the carbonation reactor (carbonator) and the slaking reactor (slaker) may be provided separately, or one reactor may serve as both carbonation reactor and slaking reactor.

The present invention uses water for preparing a suspension or for other purposes, including common tap water, industrial water, groundwater, well water and the like, and also can conveniently use ion-exchanged water, distilled water, ultrapure water, industrial waste water, and the water derived from the separation/dehydration of the calcium carbonate slurry obtained in the carbonation step.

Further in the present invention, the reaction solution can be circulated from the carbonation reactor and used as a liquid containing calcium hydroxide. If the reaction solution is circulated in this way to increase contacts between the reaction solution and carbonic acid gas, the reaction efficiency increases and desired calcium carbonate can be easily obtained.

In the present invention, ultrafine bubbles containing carbon dioxide (carbonic acid gas) are injected into a reaction vessel where they are mixed with the reaction solution. According to the present invention, the carbonation reaction can be performed with good efficiency because carbonic acid gas can be supplied to the reaction solution without any gas feeder such as a fan, blower or the like, and ultrafine bubbles of carbonic acid gas are used.

In the present invention, the carbon dioxide concentration of ultrafine bubbles containing carbon dioxide is not specifically limited, but the carbon dioxide concentration is preferably higher. Further, the amount of carbonic acid gas is not limited and can be selected as appropriate, but carbonic acid gas is preferably used at a flow rate of 100 to 10000 L/hr per kg of slaked lime, for example.

The gas containing carbon dioxide of the present invention may be substantially pure carbon dioxide gas or a mixture with another gas. For example, a gas containing air or an inert gas such as nitrogen in addition to carbon dioxide gas can be used as the gas containing carbon dioxide. Further, gases containing carbon dioxide other than carbon dioxide gas (carbonic acid gas) that can be conveniently used include exhaust gases discharged from incinerators, coal-fired boilers, heavy oil-fired boilers and the like in papermaking factories. In addition, the carbonation reaction can also be performed using carbon dioxide generated from the lime calcination process.

For preparing calcium carbonate in the present invention, various known auxiliaries can also be added. For example, chelating agents can be added to the carbonation reaction, specifically including polyhydroxycarboxylic acids such as citric acid, malic acid, and tartaric acid; dicarboxylic acids such as oxalic acid; sugar acids such as gluconic acid; aminopolycarboxylic acids such as iminodiacetic acid and ethylenediamine tetraacetic acid and alkali metal salts thereof; alkali metal salts of polyphosphoric acids such as hexametaphosphoric acid and tripolyphosphoric acid; amino acids such as glutamic acid and aspartic acid and alkali metal salts thereof; ketones such as acetylacetone, methyl acetoacetate and allyl acetoacetate; sugars such as sucrose; and polyols such as sorbitol. Surface-treating agents can also be added, including saturated fatty acids such as palmitic acid and stearic acid; unsaturated fatty acids such as oleic acid and linoleic acid; alicyclic carboxylic acids; resin acids such as abietic acid; as well as salts, esters and ethers thereof; alcoholic activators, sorbitan fatty acid esters, amide- or amine-based surfactants, polyoxyalkylene alkyl ethers, polyoxyethylene nonyl phenyl ether, sodium alpha-olefin sulfonate, long-chain alkylamino acids, amine oxides, alkylamines, quaternary ammonium salts, aminocarboxylic acids, phosphonic acids, polycarboxylic acids, condensed phosphoric acids and the like. Further, dispersants can also be used, if desired. Such dispersant include, for example, sodium polyacrylate, sucrose fatty acid esters, glycerol esters of fatty acids, ammonium salts of acrylic acid-maleic acid copolymers, methacrylic acid-naphthoxypolyethylene glycol acrylate copolymers, ammonium salts of methacrylic acid-polyethylene glycol monomethacrylate copolymers, polyethylene glycol monoacrylate and the like. These can be used alone or as a combination of two or more of them. They may be added before or after the carbonation reaction. Such additives can be added preferably in an amount of 0.001 to 20%, more preferably 0.1 to 10% of slaked lime.

Further in the present invention, materials that are not directly involved in the carbonation reaction but incorporated into the product calcium carbonate to produce composite particles can be used. Such materials include fibrous materials represented by pulp fibers, inorganic particles, organic particles, polymers and the like, and specifically fibrous materials collected from waste water of papermaking factories may be supplied to the carbonation reaction of the present invention, for example. Various composite particles including those of various shapes such as fibrous particles can be synthesized by supplying such materials to the reactor.

Synthesis of Magnesium Carbonate Microparticles

In one embodiment of the present invention according to which magnesium carbonate microparticles are synthesized in the presence of bubbles containing carbonic acid gas, a known method can be used for synthesizing magnesium carbonate. For example, basic magnesium carbonate can be synthesized via normal magnesium carbonate from magnesium bicarbonate, which is synthesized from magnesium hydroxide and carbonic acid gas. In the present invention, every step of the synthetic route of magnesium carbonate need not be performed in the presence of bubbles, but at least one step may be performed in the presence of bubbles.

For example, basic magnesium carbonate is prepared by using magnesium oxide MgO as a magnesium source, then injecting carbonic acid gas $CO_2$ into magnesium hydroxide $Mg(OH)_2$ obtained from the magnesium oxide to give magnesium bicarbonate $Mg(HCO_3)_2$, which is converted into basic magnesium carbonate via normal magnesium carbonate $MgCO_3.3H_2O$. Here, every step may be performed in the presence of bubbles, but basic magnesium carbonate can be synthesized in the presence of bubbles in any one of the steps in the present invention. In a preferred embodiment, at least the step of synthesizing magnesium bicarbonate or normal magnesium carbonate from magnesium hydroxide can be performed in the presence of bubbles. In another embodiment, the step of synthesizing basic magnesium carbonate from magnesium bicarbonate or normal magnesium carbonate can be performed in the presence of bubbles. In still another embodiment, basic magnesium carbonate can be aged in the presence of bubbles after it has been synthesized.

Typically known reaction vessels for preparing magnesium carbonate include gas injection systems and mechanically stirred systems. The gas injection systems inject carbonic acid gas into a reactor containing magnesium hydroxide to react them, but it is difficult to uniformly and precisely control the size of bubbles simply by injecting carbonic acid gas, which imposes limitations in terms of the reaction efficiency. On the other hand, the mechanically stirred systems are equipped with a stirrer inside the systems and introduce carbonic acid gas near the stirrer, thereby dispersing the carbonic acid gas as fine bubbles to improve the efficiency of the reaction with the carbonic acid gas.

If the reaction solution had a high concentration or the carbonation reaction advanced in cases where stirring took place with a stirrer provided within a reactor as in mechanically stirred systems, however, the resistance of the reaction solution increased to make it difficult to sufficiently stir it and therefore make it difficult to exactly control the carbonation reaction or the stirrer was subjected to a considerable load for sufficient stirring, thus leading to energy disadvantages. When a gas injection port is located at a lower site of the reactor and blades of the stirrer are provided near the bottom of the reactor to allow better stirring, less soluble components stay at the bottom, thereby blocking the gas injection port or disturbing the balance of the stirrer. Moreover, conventional methods required not only a reactor but also a stirrer and equipment for introducing carbonic acid gas into the reactor, which also incurred much costs of equipment. In the mechanically stirred systems, the carbonic acid gas supplied near the stirrer is dispersed as fine bubbles by the stirrer to improve the reaction efficiency, but the carbonic acid gas could not be dispersed as sufficiently fine bubbles if the concentration of the reaction solution was high or in other cases and it was also sometimes difficult to precisely control the morphology or the like of the produced inorganic particles in the carbonation reaction. In the present invention, magnesium carbonate is synthesized in the presence of ultrafine bubbles, whereby the carbonation reaction proceeds efficiently and uniform magnesium carbonate microparticles can be prepared. In the present invention, previously known reaction vessels can be used, including the gas injection systems and the mechanically stirred systems as described above without any inconveniences as a matter of course, and these vessels may be combined with a jet using a nozzle or the like.

Thus, magnesium carbonate having an oil absorption value of, for example, 600 mL/100 g or more can be obtained by using ultrafine bubbles containing carbonic acid gas. Further, magnesium carbonate having a high oil absorption value of 900 mL/100 g or more can be obtained by increasing the duration for which bubbles exist. The duration for which ultrafine bubbles exist should preferably be 20% or more, more preferably 50% or more of the total reaction period.

When magnesium carbonate is synthesized according to the present invention, the aqueous suspension of magnesium hydroxide preferably has a solids content in the order of 0.1 to 40% by weight, more preferably 0.5 to 30% by weight, still more preferably 1 to 20% by weight. If the solids content is low, the reaction efficiency decreases and the production cost increases, but if the solids content is too high, the flowability decreases and the reaction efficiency decreases. In the present invention, magnesium carbonate is synthesized in the presence of bubbles so that the reaction solution and carbonic acid gas can be suitably mixed even if a suspension (slurry) having a high solids content is used.

The aqueous suspension containing magnesium hydroxide that can be used includes those commonly used, and can be prepared by, for example, mixing magnesium hydroxide with water or by adding magnesium oxide to water. The conditions under which a slurry of magnesium hydroxide is prepared from magnesium oxide include, but not specifically limited to, an MgO concentration of 0.1% by weight or more, preferably 1% by weight or more, and a temperature of 20 to 100° C., preferably 30 to 100° C. for 5 minutes to 5 hours (preferably 2 hours or less), for example. The reactor may be batch or continuous. It should be noted that the preparation of a slurry of magnesium hydroxide and the carbonation reaction may be performed using separate reactors or one reactor in the present invention.

The present invention uses water for preparing a suspension or for other purposes, including common tap water, industrial water, groundwater, well water and the like, and also can conveniently use ion-exchanged water, distilled water, ultrapure water, industrial waste water, and the water derived from the separation/dehydration of the magnesium carbonate slurry obtained in the reaction processes of the present invention.

Further in the present invention, the reaction solution can be circulated and used as a liquid containing magnesium hydroxide. If the reaction solution is circulated in this way to increase contacts between the reaction solution and carbonic acid gas, the reaction efficiency increases and desired magnesium carbonate can be easily obtained.

In the present invention, a gas containing carbon dioxide (carbonic acid gas) is injected into a reaction vessel where it is mixed with the reaction solution. According to the present invention, the carbonation reaction can be performed with good efficiency because carbonic acid gas can be supplied to the reaction solution without any gas feeder such as a fan, blower or the like, and ultrafine bubbles of carbonic acid gas are used.

In the present invention, the carbon dioxide concentration of the gas containing carbon dioxide is not specifically limited, but the carbon dioxide concentration is preferably higher. Further, the amount of carbonic acid gas introduced into the reaction vessel is not limited and can be selected as appropriate, but carbonic acid gas is preferably used at a flow rate of 100 to 10000 L/hr per kg of magnesium hydroxide, for example.

The gas containing carbon dioxide of the present invention may be substantially pure carbon dioxide gas or a mixture with another gas. For example, a gas containing air or an inert gas such as nitrogen in addition to carbon dioxide gas can be used as the gas containing carbon dioxide. Further, gases containing carbon dioxide other than carbon dioxide gas (carbonic acid gas) that can be conveniently used include exhaust gases discharged from incinerators, coal-fired boilers, heavy oil-fired boilers and the like in papermaking factories. In addition, the carbonation reaction can also be performed using carbon dioxide generated from the lime calcination process.

In the preparation processes of the present invention, various known auxiliaries can also be added. For example, chelating agents can be added in the carbonation reaction, specifically including polyhydroxycarboxylic acids such as citric acid, malic acid, and tartaric acid; dicarboxylic acids such as oxalic acid; sugar acids such as gluconic acid; aminopolycarboxylic acids such as iminodiacetic acid and ethylenediamine tetraacetic acid and alkali metal salts thereof; alkali metal salts of polyphosphoric acids such as hexametaphosphoric acid and tripolyphosphoric acid; amino acids such as glutamic acid and aspartic acid and alkali metal salts thereof; ketones such as acetylacetone, methyl acetoacetate and allyl acetoacetate; sugars such as sucrose; and polyols such as sorbitol. Surface-treating agents can also be added, including saturated fatty acids such as palmitic acid and stearic acid; unsaturated fatty acids such as oleic acid and linoleic acid; alicyclic carboxylic acids; resin acids such as abietic acid; as well as salts, esters and ethers thereof; alcoholic activators, sorbitan fatty acid esters, amide- or amine-based surfactants, polyoxyalkylene alkyl ethers, polyoxyethylene nonyl phenyl ether, sodium alpha-olefin sulfonate, long-chain alkylamino acids, amine oxides, alkylamines, quaternary ammonium salts, aminocarboxylic acids, phosphonic acids, polycarboxylic acids, condensed phosphoric acids and the like. Further, dispersants can also be used, if desired. Such dispersants include, for example, sodium polyacrylate, sucrose fatty acid esters, glycerol esters of fatty acids, ammonium salts of acrylic acid-maleic acid copolymers, methacrylic acid-naphthoxypolyethylene glycol acrylate copolymers, ammonium salts of methacrylic acid-polyethylene glycol monomethacrylate copolymers, polyethylene glycol monoacrylate and the like. These can be used alone or as a combination of two or more of them. They may be added before or after the carbonation reaction. Such additives can be added preferably in an amount of 0.001 to 20%, more preferably 0.1 to 10% of magnesium hydroxide.

Fibers

In the present invention, inorganic carbonates such as calcium carbonate and magnesium carbonate can be further complexed with a fiber. When magnesium carbonate is to be complexed with a fiber, for example, magnesium carbonate microparticles are synthesized in a solution containing the fiber in the presence of bubbles containing carbonic acid gas. During then, the fiber can be dispersed in the reaction solution at the stage when magnesium hydroxide is obtained from a magnesium hydroxide precursor such as magnesium oxide or the like. Alternatively, the fiber can be dispersed during the step of obtaining magnesium carbonate from magnesium hydroxide. In either case, complexes of magnesium carbonate and the fiber can be obtained efficiently by immersing the fiber in the reaction solution to swell it because the reaction solution is alkaline. After dispersing the fiber, a carbonation reaction can be started immediately or a carbonation reaction can be started after swelling of the fiber has been promoted by stirring for 15 minutes or more.

The fiber forming part of the complexes is not specifically limited, and examples of fibers that can be used include, without limitation, not only natural fibers such as celluloses but also synthetic fibers artificially synthesized from raw materials such as petroleum, regenerated fibers (semisynthetic fibers) such as rayon and lyocell, and even inorganic fibers and the like. In addition to the examples mentioned above, natural fibers include protein fibers such as wool and silk yarns and collagen fibers; composite carbohydrate fibers such as chitin/chitosan fibers and alginate fibers and the like. Examples of cellulosic raw materials include pulp fibers (wood pulps and non-wood pulps) and bacterial celluloses, among which wood pulps may be prepared by pulping wood raw materials. Examples of wood raw materials include softwoods such as *Pinus densiflora, Pinus thunbergii, Abies sachalinensis, Picea jezoensis, Pinus koraiensis, Larix kaempferi, Abies firma, Tsuga sieboldii, Cryptomeria japonica, Chamaecyparis obtusa, Larix kaempferi, Abies veitchii, Picea* jezoensis var. hondoensis, Thujopsis dolabrata, Douglas fir (*Pseudotsuga menziesii*), hemlock (*Conium maculatum*), white fir (*Abies concolor*), spruces, balsam fir (*Abies balsamea*), cedars, pines, *Pinus merkusii, Pinus radiata*, and mixed materials thereof; and hardwoods such as *Fagus crenata*, birches, *Alnus japonica*, oaks, *Machilus thunbergii, Castanopsis, Betula platyphylla, Populus nigra* var. *italica*, poplars, *Fraxinus, Populus maximowiczii, Eucalyptus*, mangroves, Meranti, *Acacia* and mixed materials thereof.

The technique for pulping the wood raw materials is not specifically limited, and examples include pulping processes commonly used in the papermaking industry. Wood pulps can be classified by the pulping process and include, for example, chemical pulps obtained by digestion via the kraft process, sulfite process, soda process, polysulfide process or the like; mechanical pulps obtained by pulping with a mechanical force such as a refiner, grinder or the like; semichemical pulps obtained by pulping with a mechanical force after a chemical pretreatment; waste paper pulps; deinked pulps and the like. The wood pulps may have been unbleached (before bleaching) or bleached (after bleaching).

Examples of non-wood pulps include cotton, hemp, sisal (*Agave sisalana*), abaca (*Musa textilis*), flax, straw, bamboo, bagas, kenaf, sugar cane, corn, rice straw, *Broussonetia kazinoki×B. papyrifera, Edgeworthia chrysantha* and the like.

The pulp fibers may be unbeaten or beaten, and may be chosen depending on the properties of desired complex sheets, but they are preferably beaten. This can be expected to improve the sheet strength and to promote the adhesion of carbonates.

Synthetic fibers include polyesters, polyamides, polyolefins, and acrylic fibers; semisynthetic fibers include rayon, acetate and the like; and inorganic fibers include glass fiber, carbon fiber, various metal fibers and the like.

The fibers shown above may be used alone or as a mixture of two or more of them. Especially, the complexes preferably comprise a wood pulp or a combination of a wood pulp with a non-wood pulp and/or a synthetic fiber, more preferably a wood pulp alone.

In preferred embodiments, the fiber forming part of the complexes of the present invention is a pulp fiber. Alternatively, fibrous materials collected from waste water of papermaking factories may be supplied to the carbonation reaction of the present invention, for example. Various composite particles including those of various shapes such as fibrous particles can be synthesized by supplying such materials to the reactor.

In the present invention, powdered celluloses may be used as pulp fibers. The term "powdered cellulose" refers to rod-like particles formed of a microcrystalline cellulose. The degree of polymerization of celluloses in the powdered celluloses is preferably in the order of 100 to 1500, and the powdered celluloses preferably have a crystallinity of 70 to 90% as determined by X-ray diffraction and also preferably have a volume average particle size of 1 µm to 100 µm, more preferably 2 µm to 50 µm as determined by a laser diffraction particle size distribution analyzer. If they have a volume average particle size of 1 µm to 100 µm, they are suitably applied for filter aids. Powdered celluloses used in the present invention can be prepared, for example, by purifying/drying and grinding/sieving the undecomposed residue obtained after acid hydrolysis of a cleaned pulp (non-crystalline region of pulp), or may be commercially available products such as KC FLOCK (from Nippon Paper Industries Co., Ltd.), CEOLUS (from Asahi Kasei Chemicals Corp.), AVICEL (from FMC Corporation) and the like.

In the present invention, materials that are not directly involved in the carbonation reaction but incorporated into the product calcium carbonate or magnesium carbonate to produce composite particles can be used in addition to the fibers. If magnesium carbonate is synthesized in a solution containing inorganic particles, organic particles, polymers or the like in addition to a fiber such as a pulp fiber used in the present invention, composite particles incorporating these materials can be prepared.

Reaction Conditions

In the present invention, the conditions of the carbonation reaction are not specifically limited, and appropriately selected to suit the intended purpose. For example, the temperature of the carbonation reaction can be 0 to 90° C., preferably 10 to 70° C. The reaction temperature can be controlled by regulating the temperature of the reaction solution using a temperature controller, and if the temperature is low, the reaction efficiency decreases and the cost increases, but if it exceeds 90° C., coarse particles tend to increase.

Further in the present invention, the carbonation reaction can be a batch reaction or a continuous reaction. Typically, the reaction is preferably performed as a batch process because of the convenience in removing residues after the carbonation reaction. The scale of the reaction is not specifically limited, and can be 100 L or less, or more than 100 L. The capacity of the reaction vessel can be, for example, about 10 L to 100 L, or may be about 100 L to 1000 L.

Further, the carbonation reaction can be controlled by monitoring the pH of the reaction suspension, and the carbonation reaction can be conducted until the pH reaches less than 9, preferably less than 8, more preferably around 7, for example, depending on the pH profile of the reaction solution.

Alternatively, the carbonation reaction can be controlled by monitoring the conductivity of the reaction solution. The carbonation reaction is preferably conducted until the conductivity drops to 1 mS/cm or less.

Furthermore, the carbonation reaction can be controlled by the reaction period, and specifically it can be controlled by adjusting the duration for which the reactants stay in the reactor. Additionally, the reaction can also be controlled in the present invention by stirring the reaction solution in the carbonation reactor or performing the carbonation reaction as a multistage reaction.

In the present invention, the reaction product inorganic particles are obtained as a suspension so that it can be stored in a storage tank or subjected to processing such as concentration/dehydration, grinding, classification, aging, or dispersion, as appropriate. These can be accomplished by known processes, which may be appropriately selected taking into account the intended purpose, energy efficiency and the like. For example, the concentration/dehydration process is performed by using a centrifugal dehydrator, thickener or the like. Examples of such centrifugal dehydrators include decanters, screw decanters and the like. If a filter or dehydrator is used, the type of it is not specifically limited either, and those commonly used can be used, including, for example, pressure dehydrators such as filter presses, drum filters, belt presses and tube presses or vacuum drum filters such as Oliver filters or the like, which can be suitably used to give a calcium carbonate cake. Classification means include sieves such as meshes, outward or inward flow slotted or round-hole screens, vibrating screens, heavyweight contaminant cleaners, lightweight contaminant cleaners, reverse cleaners, screening testers and the like. Dispersion means include high speed dispersers, low speed kneaders and the like.

In the present invention, sieving can be performed to separate unreacted components and the product inorganic particles in the reaction solution by using, for example, a wet vibrating sieve.

The calcium carbonate or magnesium carbonate obtained by the present invention can be compounded into fillers or pigments as a suspension without being completely dehydrated, or can be dried into powder. The dryer used in the latter case is not specifically limited either, but air stream dryers, band dryers, spray dryers and the like can be suitably used, for example.

The inorganic particles such as calcium carbonate or magnesium carbonate obtained by the present invention often take the form of secondary particles resulting from the aggregation of fine primary particles, wherein the secondary particles can be produced to suit the intended purpose through an aging process or can be produced by breaking down aggregates by grinding. Grinding means include ball mills, sand grinder mills, impact mills, high pressure homogenizers, low pressure homogenizers, Dyno mills, ultrasonic mills, Kanda grinders, attritors, millstone type mills, vibration mills, cutter mills, jet mills, disintegrators, beaters, single screw extruders, twin screw extruders, ultrasonic stirrers, juicers/mixers for home use, etc.

The inorganic particles obtained by the present invention can be modified by known methods. In one embodiment, for example, they can be hydrophobized on their surfaces to enhance the miscibility with resins or the like.

EXAMPLES

The following specific experimental examples further illustrate the present invention, but the present invention is not limited to these experimental examples. Unless otherwise specified, the concentrations, parts and the like as used herein are based on weight, and the numerical ranges are described to include their endpoints.

Figure 2:
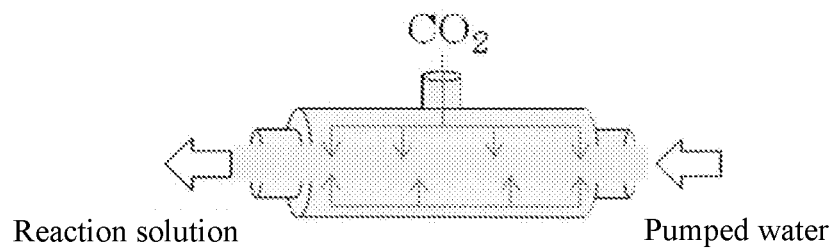
FIG. 2 is a schematic diagram showing an ultrafine bubble generator used in Experiment 1.

Experiment 1: Synthesis of Calcium Carbonate Microparticles (Sample 1-1 to Sample 1-7)
Sample 1-1 to Sample 1-4 were prepared using a reaction system as shown in FIG. 1 charged with 30 L of a 1 to 2% aqueous suspension of slaked lime (calcium hydroxide: $Ca(OH)_2$) by circulating the reaction solution at a pumping flow rate of 80 L/min through an ultrafine bubble generator (a shear type, YJ-9 from ENVIRO VISION CO., LTD., FIG. 2) (at a jet flow rate from the nozzle of 125 L/min·cm$^2$). A lot of ultrafine bubbles containing carbonic acid gas were generated in the reaction solution by injecting carbonic acid gas through the intake port of the ultrafine bubble generator to synthesize calcium carbonate particles by the carbonation process. The reaction was performed at a reaction temperature of 15° C. and a carbonic acid gas injection flow rate of 3 to 40 L/min, and the reaction was stopped when the pH of the reaction solution reached 7 to 8 (from the pH of about 13 before the reaction). The ultrafine bubbles had an average particle size of about 137 nm, and the average duration from the generation of the ultrafine bubbles to the disappearance of the ultrafine bubbles (herein also referred to as "bubble lifetime") was 60 minutes or more.

Figure 3:
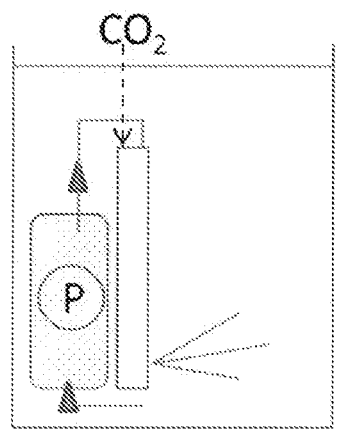
FIG. 3 is a schematic diagram showing a reaction system used in Experiment 1 (Sample 1-5 to Sample 1-7).

Ultrafine bubbles were generated by using another ultrafine bubble generator (a swirling jet type, FJP-6 from YBM Co., Ltd.) to synthesize calcium carbonate particles by the carbonation process (Sample 1-5 to Sample 1-7). In these experimental examples, ultrafine bubbles were generated by connecting a submersible pump to the ultrafine bubble generator, as shown in FIG. 3. The ultrafine bubbles were generated at a jet flow rate from the nozzle of 125 L/min·cm$^2$, and the ultrafine bubbles had an average particle size of 80 nm and a bubble lifetime of about 60 minutes or more.

When slaked lime and carbonic acid gas were reacted in the presence of ultrafine bubbles (submicron bubbles) containing carbonic acid gas according to the present invention, calcium carbonate having a very small particle size characterized by an average particle size of 200 nm or less could be prepared and the particle shape was very uniform. On the other hand, the reaction period could be shortened to 3 minutes at minimum (Sample 1-3) as the injection flow rate of carbonic acid gas increased, and calcium carbonate having a smaller particle size could be synthesized by increasing the outlet pressure (Sample 1-4). Further, the process of the present invention achieved low power consumption per production output so that calcium carbonate microparticles could be synthesized with good efficiency under low-energy conditions.

Figures 1, 4:
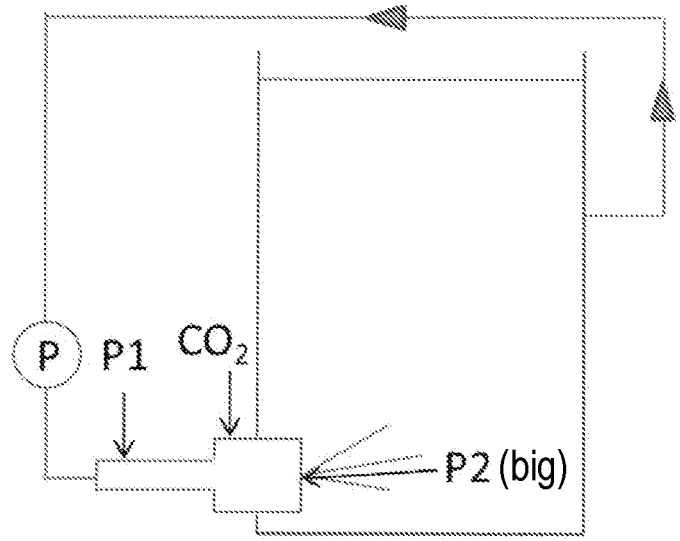
Figures 2, 4:
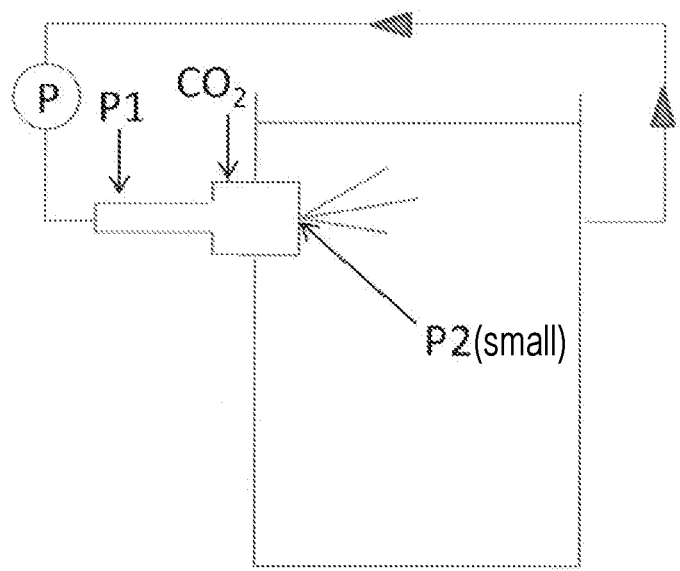
Figures 3, 4:
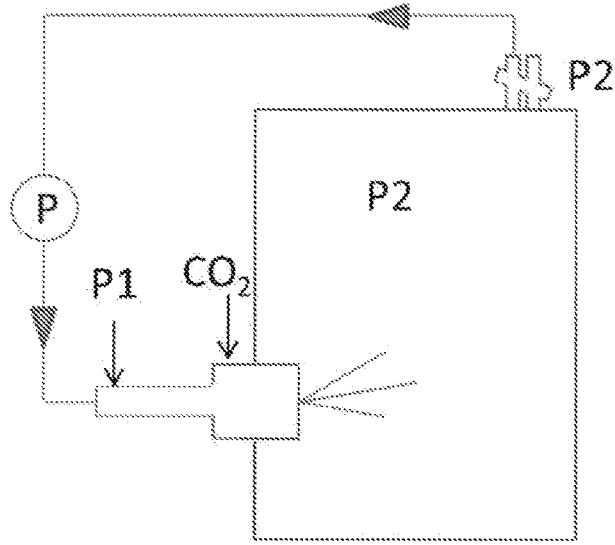

It should be noted that, in the embodiment shown in FIG. 1, the ultrafine bubble generator was placed completely within the reaction vessel, but the ultrafine bubble generator may also be connected to a circulating line, as shown in FIG. 4.

Figure 5:
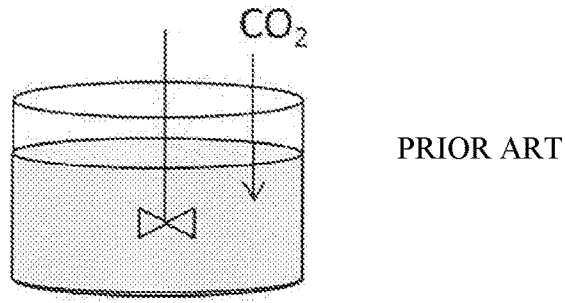
FIG. 5 is a schematic diagram showing a reaction system used in Experiment 1 (a cylindrical vessel).

(Sample 1-8 to Sample 1-10)
As comparative examples, calcium carbonate microparticles were synthesized in the presence of bubbles having an average particle size of more than 1 μm containing carbonic acid gas, Sample 1-8 was prepared using a 20-L open top cylindrical vessel charged with a slaked lime suspension by injecting carbonic acid gas through a hollow hose to synthesize calcium carbonate particles by the carbonation process, as shown in FIG. 5. The bubbles injected through the hollow hose had an average particle size of about 8 mm and an average bubble lifetime of about 3 seconds. In Sample 1-8, calcium carbonate having an average particle size of 50 nm could be prepared, but a long-time reaction was required and the efficiency of the reaction with carbonic acid gas was low probably because carbonic acid gas dispersed into the air.

Figure 6:
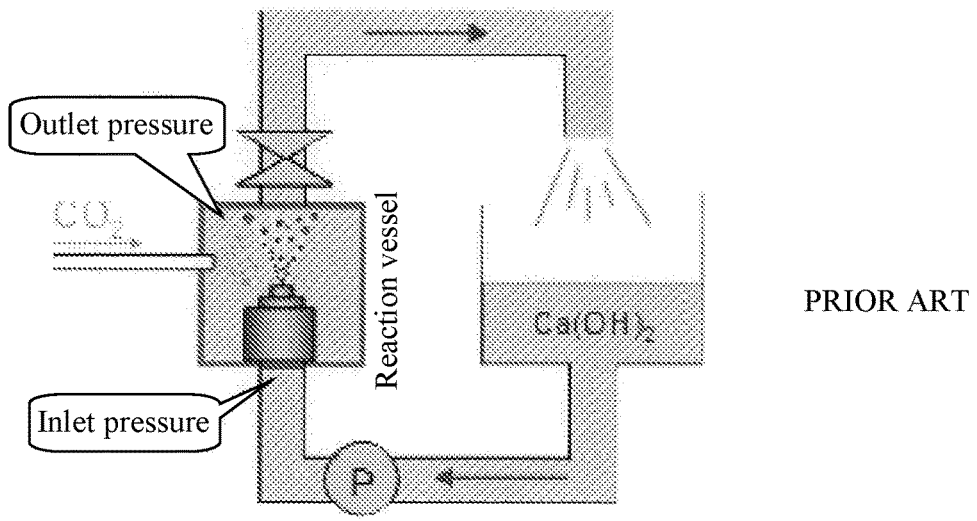
FIG. 6 is a schematic diagram showing a reaction system used in Experiment 1 (a CV system).
Figure 7:
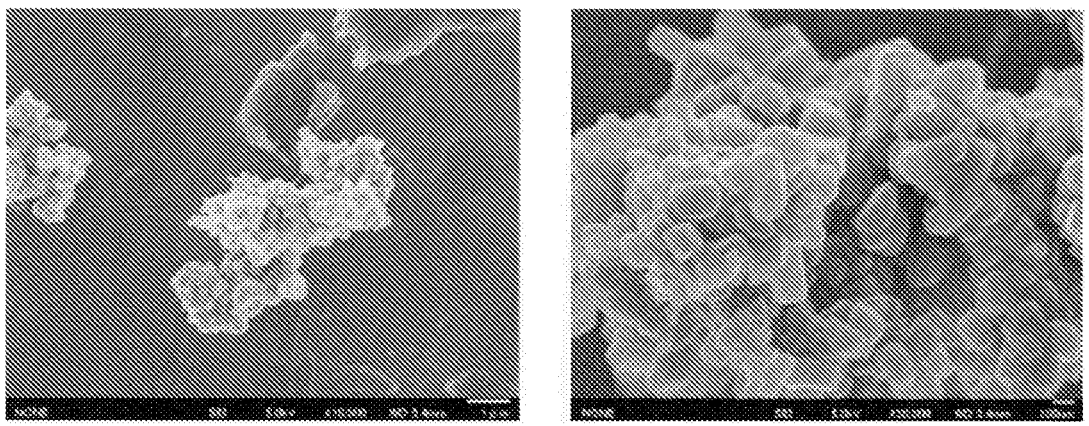
FIG. 7 shows electron micrographs of calcium carbonate microparticles synthesized in Experiment 1 (Sample 1-1; magnification: left 10000×, right 50000×).
Figure 8:
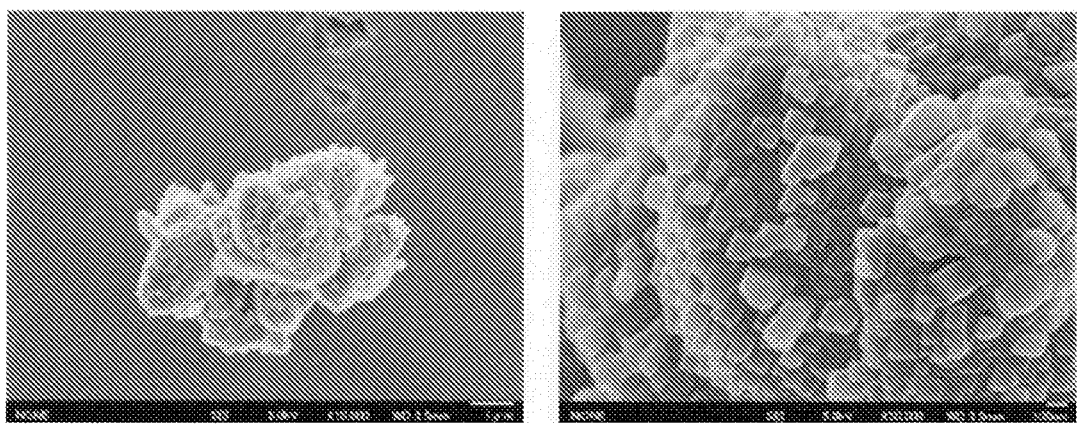
FIG. 8 shows electron micrographs of calcium carbonate microparticles synthesized in Experiment 1 (Sample 1-2; magnification: left 10000×, right 50000×).
Figure 9:
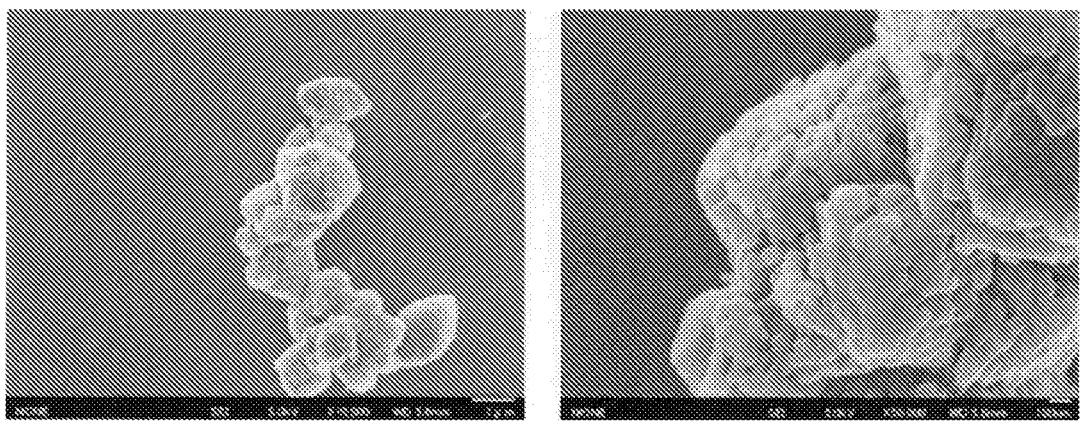
FIG. 9 shows electron micrographs of calcium carbonate microparticles synthesized in Experiment 1 (Sample 1-3; magnification: left 10000×, right 50000×).
Figure 10:
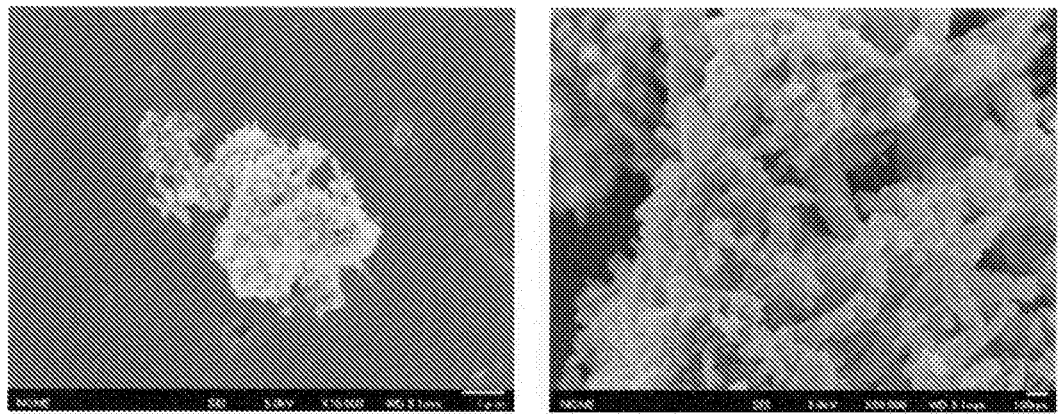
FIG. 10 shows electron micrographs of calcium carbonate microparticles synthesized in Experiment 1 (Sample 1-4; magnification: left 10000×, right 50000×).
Figure 11:
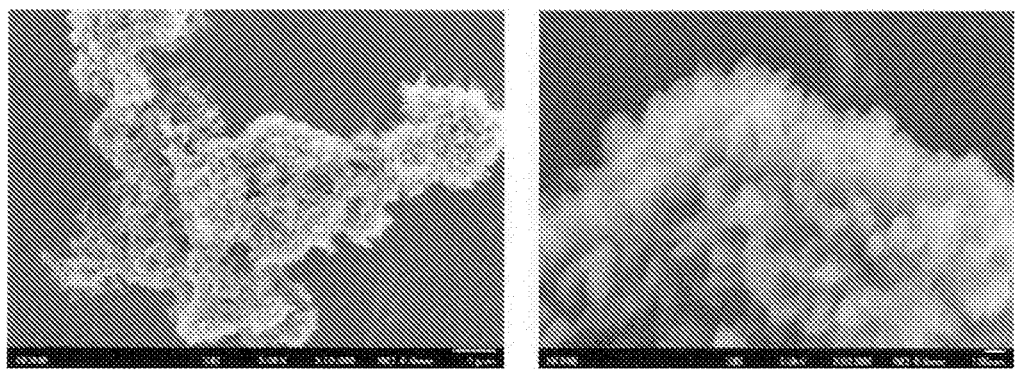
FIG. 11 shows electron micrographs of calcium carbonate microparticles synthesized in Experiment 1 (Sample 1-5; magnification: left 10000×, right 50000×).
Figure 12:
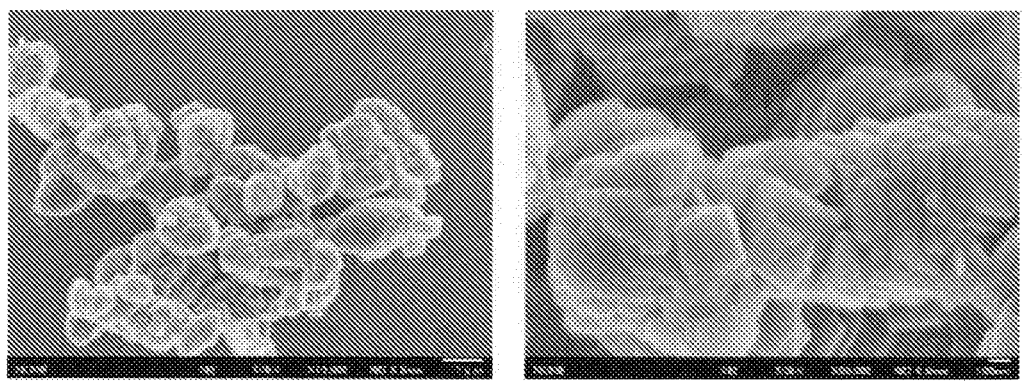
FIG. 12 shows electron micrographs of calcium carbonate microparticles synthesized in Experiment 1 (Sample 1-6; magnification: left 10000×, right 50000×).
Figure 13:
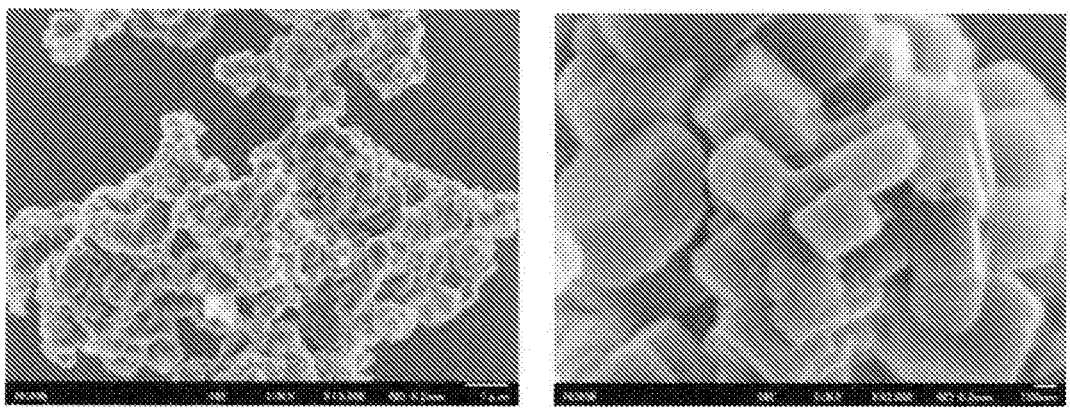
FIG. 13 shows electron micrographs of calcium carbonate microparticles synthesized in Experiment 1 (Sample 1-7; magnification: left 10000×, right 50000×).
Figure 14:
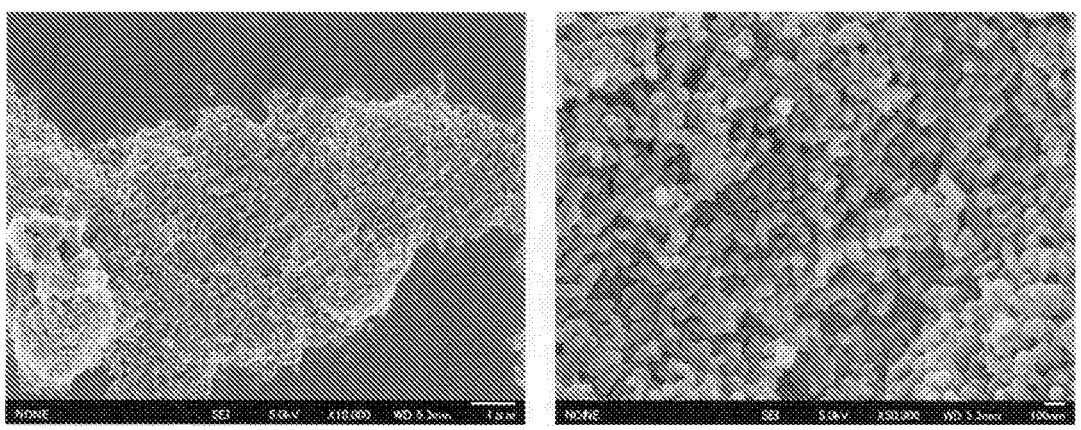
FIG. 14 shows electron micrographs of calcium carbonate microparticles synthesized in Experiment 1 (Sample 1-8; magnification: left 10000×, right 50000×).
Figure 15:
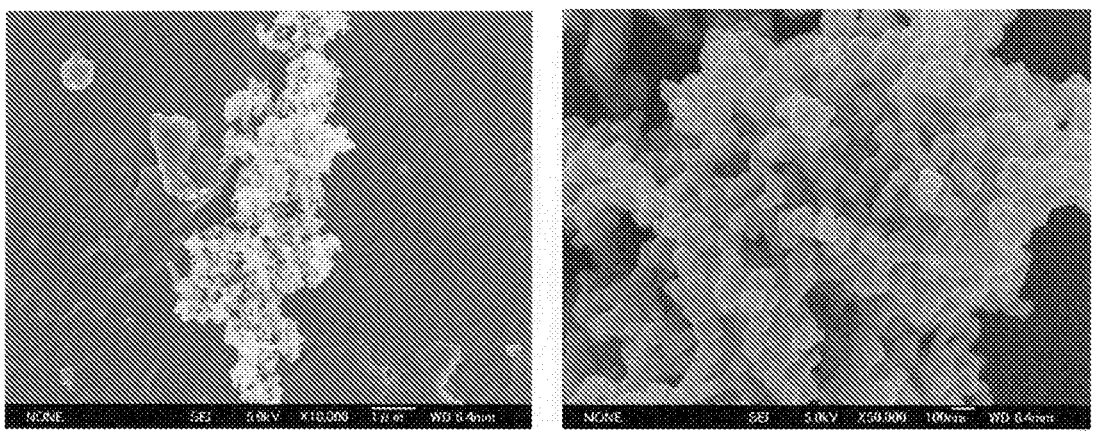
FIG. 15 shows electron micrographs of calcium carbonate microparticles synthesized in Experiment 1 (Sample 1-9; magnification: left 10000×, right 50000×).
Figure 16:
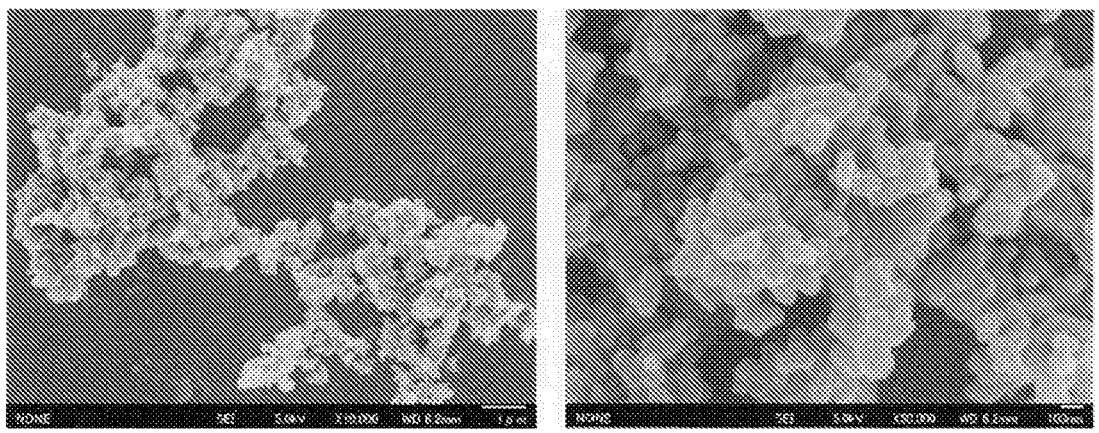
FIG. 16 shows electron micrographs of calcium carbonate microparticles synthesized in Experiment 1 (Sample 1-10; magnification: left 10000×, right 50000×).
Figure 17:
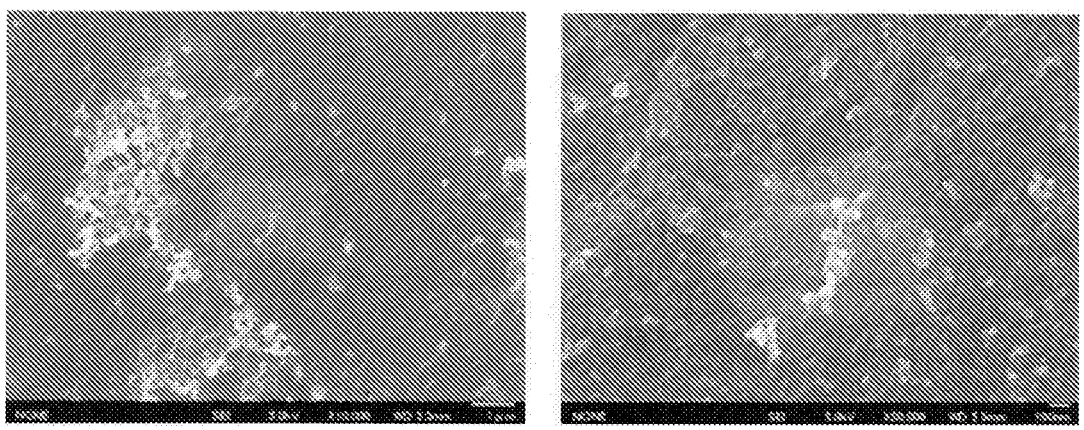
FIG. 17 shows electron micrographs of magnesium carbonate microparticles synthesized in Experiment 2 (Sample 2-1; magnification: left 10000×, right 50000×).
Figure 18:
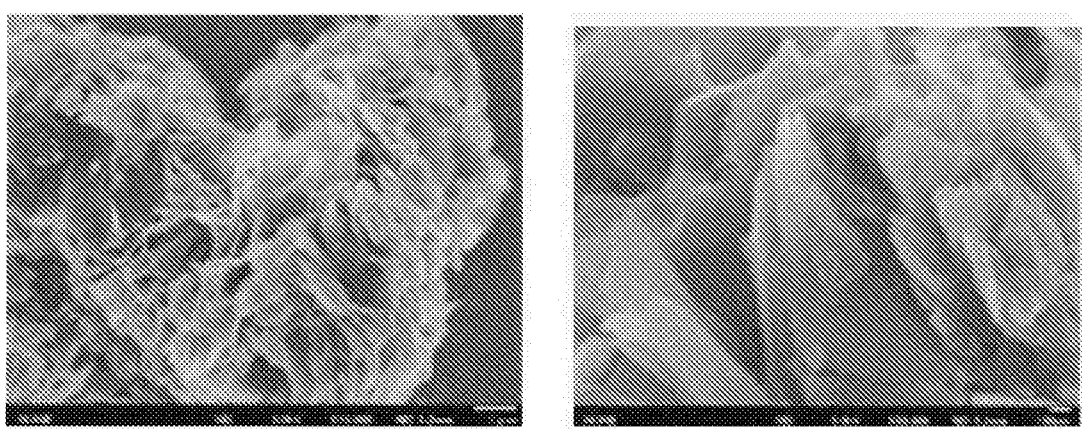
FIG. 18 shows electron micrographs of magnesium carbonate microparticles synthesized in Experiment 2 (Sample 2-2; magnification: left 10000×, right 50000×).
Figure 19:
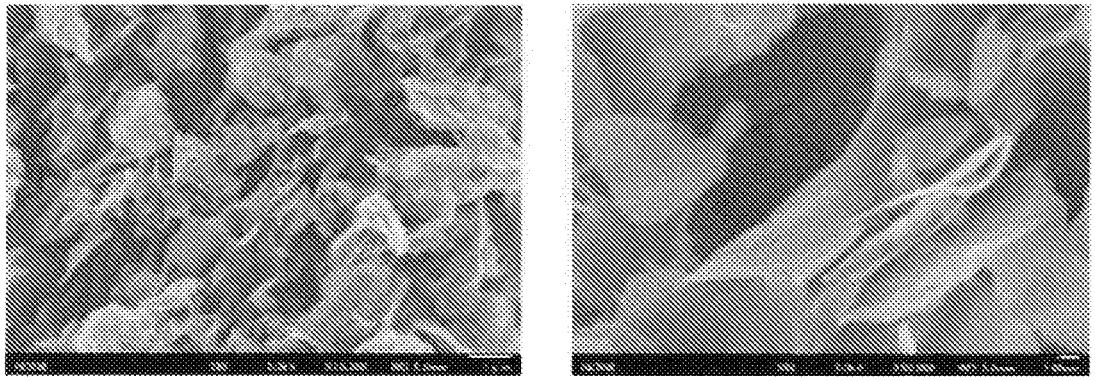
FIG. 19 shows electron micrographs of magnesium carbonate microparticles synthesized in Experiment 2 (Sample 2-3; magnification: left 10000×, right 50000×).
Figure 20:
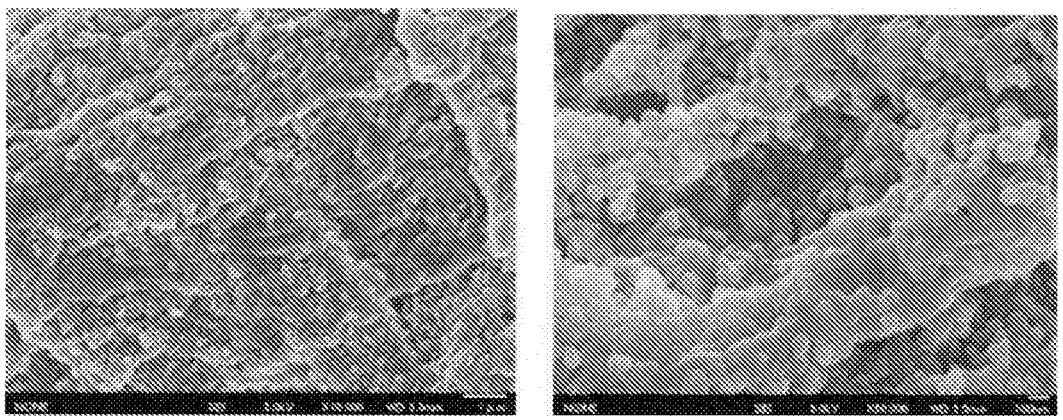
FIG. 20 shows electron micrographs of a complex synthesized in Experiment 3 (Sample 3-1; magnification: left 10000×, right 50000×).
Figure 21:
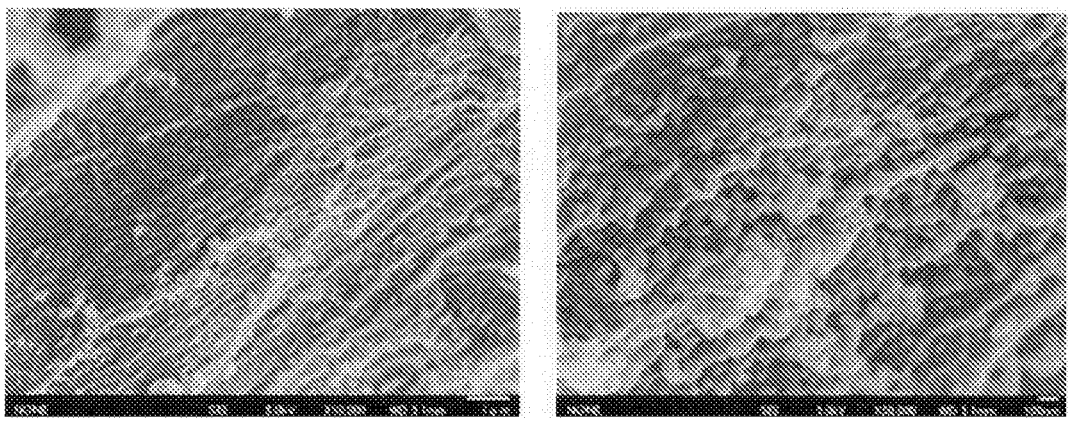
FIG. 21 shows electron micrographs of a complex synthesized in Experiment 3 (Sample 3-2; magnification: left 10000×, right 50000×).
Figure 22:
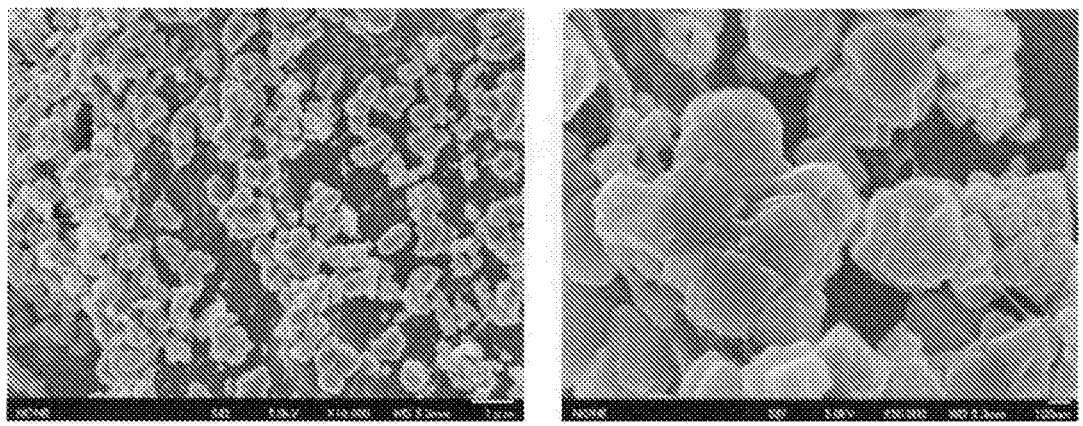
FIG. 22 shows electron micrographs of a complex synthesized in Experiment 3 (Sample 3-3; magnification: left 10000×, right 50000×).
Figure 23:
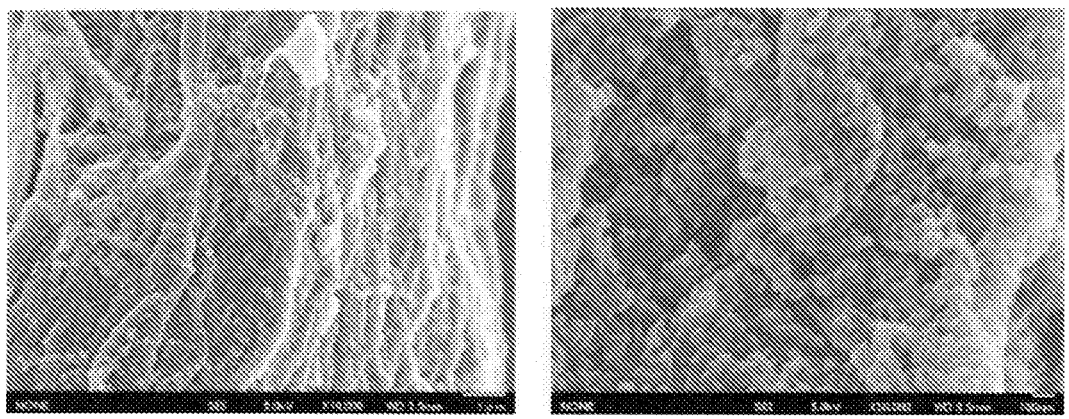
FIG. 23 shows electron micrographs of a complex synthesized in Experiment 3 (Sample 3-4; magnification: left 10000×, right 50000×).
Figure 24:
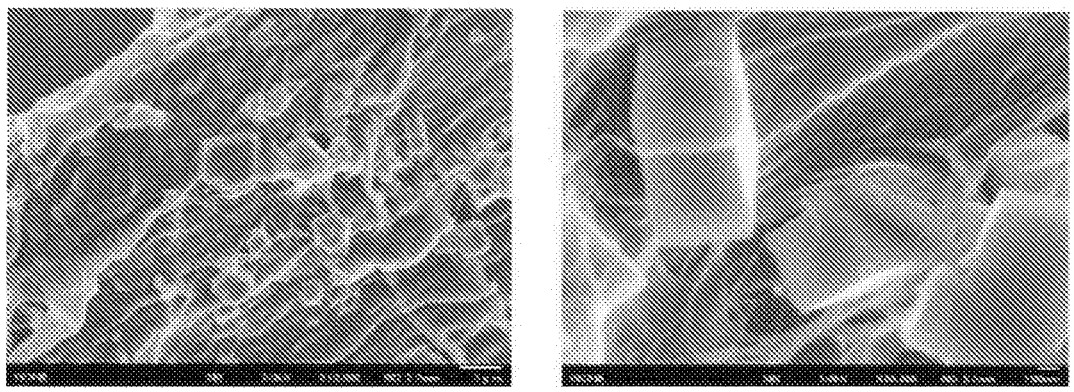
FIG. 24 shows electron micrographs of a complex synthesized in Experiment 3 (Sample 3-5; magnification: left 10000×, right 50000×).
Figure 25:
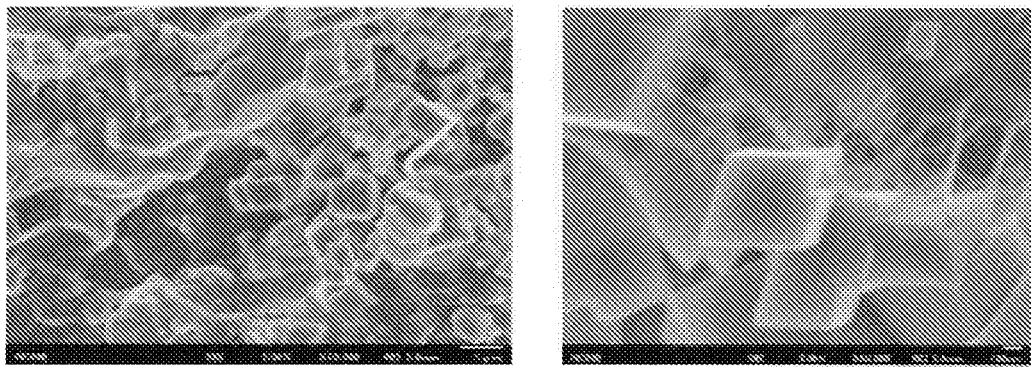
FIG. 25 shows electron micrographs of a complex synthesized in Experiment 3 (Sample 3-6; magnification: left 10000×, right 50000×).
Figure 26:
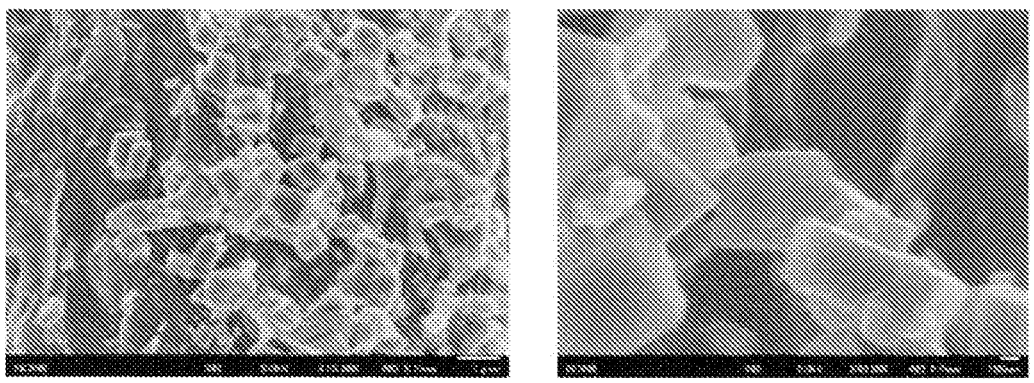
FIG. 26 shows electron micrographs of a complex synthesized in Experiment 3 (Sample 3-7; magnification: left 10000×, right 50000×).
Figure 27:
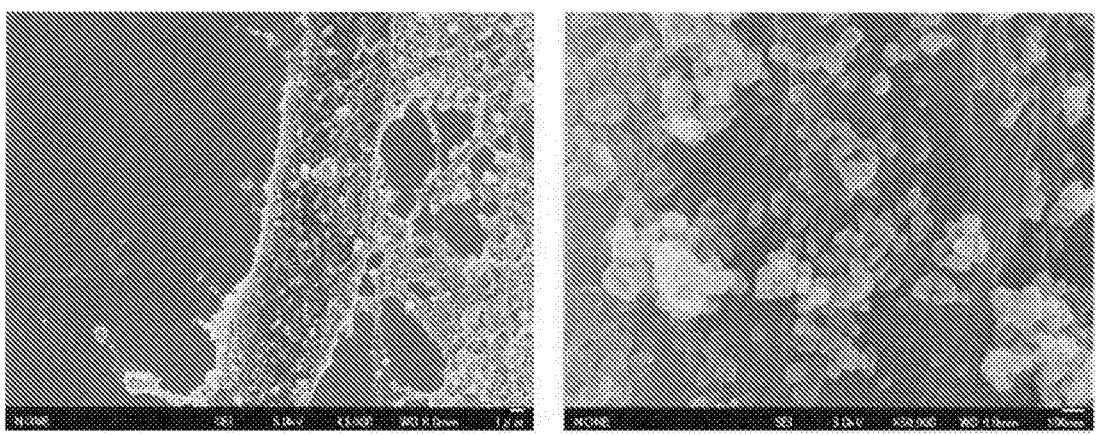
FIG. 27 shows electron micrographs of a complex synthesized in Experiment 3 (Sample 3-8; magnification: left 3000×, right 10000×).
Figure 28:
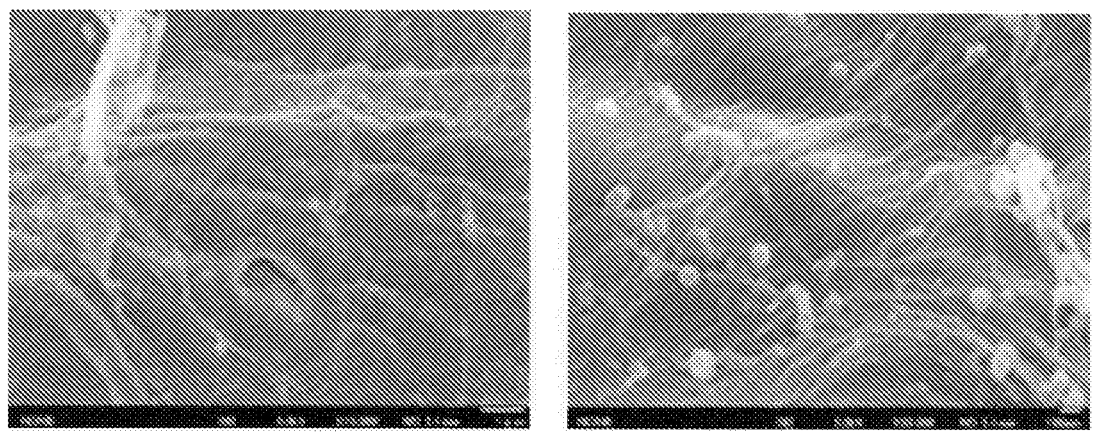
FIG. 28 shows electron micrographs of a complex synthesized in Experiment 4 (Sample 4-1; magnification: left 10000×, right 50000×).
Figure 29:
FIG. 29 shows an electron micrograph of a complex synthesized in Experiment 4 (Sample 4-2; magnification: 10000×).

Sample 1-9 and Sample 1-10 were prepared using a cavitation system as shown in FIG. 6 (a small system having a capacity of 50 L or a large system having a capacity of 200 L) charged with a 2% aqueous suspension of slaked lime by generating cavitation bubbles in the reaction vessel while injecting carbonic acid gas into the reaction vessel at 12 L/min to synthesize calcium carbonate particles. Sample 1-9 and Sample 1-10 were prepared using a small system (charged with 9.5 L of the aqueous suspension of slaked lime) and a large system (charged with 100 L of the aqueous suspension of slaked lime) respectively, by reacting slaked lime and carbonic acid gas in the presence of cavitation bubbles at an inlet pressure (upstream pressure, P1) of 7

MPa and an outlet pressure (downstream pressure, P2) of 0.3 MPa. The cavitation bubbles had an average particle size of about 50 μm, and an average bubble lifetime of about 0.1 second. The calcium carbonates obtained in Sample 1-9 and Sample 1-10 had an average particle size of about 100 nm, but the power consumption per unit time was higher than observed with Sample 1-1.

According to the present invention, the power consumption per unit time is about 14 times lower than observed by using cavitation systems so that calcium carbonate microparticles can be prepared very efficiently.

of 100 nm or less can be prepared and the particle shape was very uniform. Further, the process of the present invention achieved low power consumption per production output so that magnesium carbonate microparticles could be synthesized with good efficiency under low-energy conditions.

(Sample 2-2)

As a comparative example, magnesium carbonate microparticles were synthesized in the presence of bubbles having an average particle size of more than 1 μm containing carbonic acid gas.

TABLE 1

The results of Experiment 1 (Synthesis of calcium carbonate microparticles)

| Number | System | Bubble average particle size | Bubble lifetime | Pressure, MPa | | Flow rate L/min · cm2 | Ca(OH)2 Conc. % | Carbon dioxide flow rate L/min | Reaction period min | Primary particle size | Average particle size | Power consumption per output kwh/t |
|---|---|---|---|---|---|---|---|---|---|---|---|---|
| | | | | P1 | P2 | | | | | nm | | |
| 1-1 | YJ-9 | 137 nm | ≥60 min | 2.0 | 0.05 | 125 | 1 | 3 | 28 | 100-200 | 140 | 0.48 |
| 1-2 | | 137 nm | ≥60 min | 2.0 | 0.05 | 125 | 1 | 12 | 8 | 100-200 | 120 | 0.14 |
| 1-3 | | 137 nm | ≥60 min | 2.0 | 0.05 | 125 | 1 | 40 | 3 | 80-120 | 100 | 0.06 |
| 1-4 | | 137 nm | ≥60 min | 2.0 | 0.1 | 125 | 1 | 12 | 8 | 40-60 | 50 | 0.41 |
| 1-5 | FJP-6 | 80 nm | ≥60 min | 0.06 | 0.05 | 125 | 1 | 3 | 25 | 50-100 | 80 | 0.59 |
| 1-6 | | 80 nm | ≥60 min | 0.06 | 0.05 | 125 | 1 | 12 | 8 | 100-200 | 180 | 0.19 |
| 1-7 | | 80 nm | ≥60 min | 0.06 | 0.05 | 125 | 1 | 40 | 6 | 100-300 | 200 | 0.14 |
| 1-8 | Cylindrical vessel | 8 mm | 3 sec | 0.0 | 0.0 | 0 | 1 | 4 | 33 | 40-60 | 50 | 0.01 |
| 1-9 | Small CV | 50 μm | 0.1 sec | 7.0 | 0.3 | 370 | 2 | 12 | 4 | 50-130 | 100 | 3.51 |
| 1-10 | Large CV | 50 μm | 0.1 sec | 7.0 | 0.3 | 637 | | | 54 | 80-200 | 100 | 6.75 |

Experiment 2: Synthesis of Magnesium Carbonate Microparticles (Sample 2-1)

Magnesium carbonate microparticles were synthesized using a system similar to the one used in Experiment 1. Specifically, the system shown in FIG. 1 charged with 30 L of an about 1% aqueous suspension of magnesium hydroxide ($Mg(OH)_2$) was used, and the reaction solution was circulated at a pumping flow rate of 80 L/min through an ultrafine bubble generator (YJ-9 from ENVIRO VISION CO., LTD.) (at a jet flow rate from the nozzle of 125 L/min·cm$^2$). A lot of ultrafine bubbles containing carbonic acid gas were generated in the reaction solution by injecting carbonic acid gas through an intake port of the ultrafine bubble generator to synthesize magnesium carbonate particles by the carbonation process. The reaction was performed at a reaction temperature of 15° C. and a carbonic acid gas injection flow rate of 20 L/min, and the reaction was stopped when the pH of the reaction solution reached 7 to 8 (from the pH of about 10.5 before the reaction). In this experiment, the ultrafine bubbles had an average particle size of about 137 nm, and the average duration from the generation of the ultrafine bubbles to the disappearance of the ultrafine bubbles (herein also referred to as "bubble lifetime") was 60 minutes or more.

When ultrafine bubbles (submicron bubbles) containing carbonic acid gas existed in the reaction system according to the present invention, magnesium carbonate having a very small particle size characterized by an average particle size As shown in FIG. 5, magnesium carbonate particles were synthesized by the carbonation process by injecting carbonic acid gas through a hollow hose into a 20-L open top cylindrical vessel charged with a suspension of magnesium hydroxide. The bubbles injected through the hollow hose had an average particle size of about 8 mm and an average bubble lifetime of about 3 seconds. The resulting product was magnesium carbonate having a large average particle size of about 1 μm (1000 nm), and a long-time reaction was required and the efficiency of the reaction with carbonic acid gas was low probably because carbonic acid gas dispersed into the air.

(Sample 2-3)

Magnesium carbonate particles were synthesized using a cavitation system (a small system having a capacity of 50 L) as shown in FIG. 6 charged with 9.5 L of a 1% aqueous suspension of magnesium carbonate by generating cavitation bubbles in the reaction vessel while injecting carbonic acid gas into the reaction vessel at 12 L/min. Slaked lime and carbonic acid gas were reacted in the presence of cavitation bubbles at an inlet pressure (upstream pressure, P1) of 7 MPa and an outlet pressure (downstream pressure, P2) of 0.3 MPa, but the cavitation bubbles had an average particle size of about 50 μm and an average bubble lifetime of about 0.1 second. In Sample 2-3, the power consumption per production output (1 ton) was about 14 times higher than observed with Sample 2-1.

TABLE 2

The results of Experiment 2 (Synthesis of magnesium carbonate microparticles)

| Number | System | Bubble average particle size | Bubble lifetime | Pressure, MPa P1 | Pressure, MPa P2 | Flow rate L/min · cm2 | Mg(OH)2 Conc. % | Carbon dioxide flow rate L/min | Reaction period min | Primary particle size nm | Average particle size nm | Power consumption per output kwh/t |
|---|---|---|---|---|---|---|---|---|---|---|---|---|
| 2-1 | YJ-9 | 137 nm | ≥60 min | 2.0 | 0.1 | 125 | 1 | 20 | 15 | 30-100 | 100 | 0.26 |
| 2-2 | Cylindrical vessel | 8 mm | 3 sec | 0.0 | 0.0 | 0 | 1 | 0.5 | 20 | 100-1500 | 1000 | 0.01 |
| 2-3 | Small CV | 50 μm | 0.1 sec | 7.0 | 0.3 | 370 | 1 | 4 | 15 | 100-200 | 130 | 3.51 |

Experiment 3: Synthesis of Calcium Carbonate/Fiber Complexes

The synthesis reaction of calcium carbonate was performed in the same manner as described in Experiment 1 except that each suspension contained a pulp slurry at a concentration of 1%. The pulp used was a bleached softwood kraft pulp (NBKP, Canadian standard freeness: 500 ml).

The reaction was started at a temperature of about 15° C. and carbonic acid gas injection flow rates of 3, 12 and 40 L/min, and the reaction was stopped when the pH of the reaction solution reached 7 to 8. Similarly to Experiment 1, a lot of ultrafine bubbles (having an average particle size of 137 nm and a bubble lifetime of 60 minutes or more) containing carbonic acid gas were generated in the reaction solution by supplying carbonic acid gas to an ultrafine bubble generator (a shear type or a swirling jet type) to synthesize calcium carbonate particles by the carbonation process. The ultrafine bubbles in Sample 3-1 to Sample 3-4 (a shear type, YJ-9 from ENVIRO VISION CO., LTD.) had an average particle size of about 137 nm (and a bubble lifetime of 60 minutes or more), and the ultrafine bubbles in Sample 3-5 to Sample 3-7 (a swirling jet type, FJP-6 from YBM Co., Ltd.) had an average particle size of about 80 nm (and a bubble lifetime of 60 minutes or more).

The results are shown in the table below, indicating that when slaked lime and carbonic acid gas were reacted in the presence of ultrafine bubbles (submicron bubbles) containing carbonic acid gas according to the present invention, inorganic particles of 300 nm or less deposited on the surface of the pulp fiber, whereby inorganic particles/pulp fiber complexes could be synthesized (Sample 3-1 and Sample 3-2). On the other hand, the size of the particles on the surface of the fiber tended to increase to about 500 nm as the injection flow rate of carbonic acid gas increased (Sample 3-3). Further, calcium carbonate having a smaller particle size could be complexed with the pulp fiber by increasing the outlet pressure (Sample 3-4).

For comparison, cavitation bubbles were generated using a cavitation system (a large system) as shown in FIG. 6 during the reaction between the suspension and carbonic acid gas in the same manner as described for Sample 1-10 in Experiment 1 (the cavitation bubbles had an average particle size of about 50 μm and an average bubble lifetime of about 0.1 second). In this case (Sample 3-8), calcium carbonate having an average particle size of 100 nm could be prepared, but the power consumption per production output (1 ton) was 10 times or more higher than observed with Sample 3-1.

Thus, the present invention allows calcium carbonate/fiber complexes to be prepared very efficiently with low power consumption per unit time.

TABLE 3

The results of Experiment 3 (Synthesis of calcium carbonate/fiber complexes)

| Number | System | Bubble average particle size | Bubble lifetime | Pressure, MPa P1 | Pressure, MPa P2 | Flow rate L/min · cm2 | Ca(OH)2 Conc. % | Carbon dioxide flow rate L/min | Reaction period min | Primary particle size nm | Average particle size nm | Power consumption per output kwh/t |
|---|---|---|---|---|---|---|---|---|---|---|---|---|
| 3-1 | YJ-9 | 137 nm | ≥60 min | 2.0 | 0.05 | 125 | 1 | 3 | 36 | 100-150 | 100 | 0.32 |
| 3-2 | | 137 nm | ≥60 min | 2.0 | 0.05 | 125 | 1 | 12 | 13 | 80-100 | 100 | 0.12 |
| 3-3 | | 137 nm | ≥60 min | 2.0 | 0.05 | 125 | 1 | 40 | 5.3 | 200-500 | 300 | 0.05 |
| 3-4 | | 137 nm | ≥60 min | 2.0 | 0.1 | 125 | 1 | 12 | 12 | 30-50 | 50 | 0.20 |
| 3-5 | FJP-6 | 80 nm | ≥60 min | 0.06 | 0.05 | 125 | 1 | 3 | 23 | 50-100 | 80 | 0.31 |
| 3-6 | | 80 nm | ≥60 min | 0.06 | 0.05 | 125 | 1 | 12 | 9 | 100-200 | 180 | 0.15 |
| 3-7 | | 80 nm | ≥60 min | 0.06 | 0.05 | 125 | 1 | 40 | 4 | 100-300 | 200 | 0.05 |
| 3-8 | Large CV | 50 μm | 0.1 sec | 7.0 | 0.3 | 637 | 1 | 12 | 10 | 50-100 | 100 | 3.93 |

Experiment 4: Synthesis of Magnesium Carbonate/Fiber Complexes

The synthesis reaction of magnesium carbonate was performed in the same manner as described in Experiment 2 except that each suspension contained a pulp slurry at a concentration of 1%. The pulp used was a bleached softwood kraft pulp (NBKP, Canadian standard freeness: 500 ml).

The reaction was started at a temperature of about 15° C. and a carbonic acid gas injection flow rate of 20 L/min, and the reaction was stopped when the pH of the reaction solution reached 7 to 8. Similarly to Experiment 2, a lot of ultrafine bubbles (having an average particle size of 137 nm and a bubble lifetime of 60 minutes or more) containing carbonic acid gas were generated in the reaction solution by supplying carbonic acid gas to an ultrafine bubble generator (a shear type, YJ-9 from ENVIRO VISION CO., LTD.) to synthesize magnesium carbonate particles by the carbonation process.

The results are shown in the table below, indicating that when magnesium hydroxide and carbonic acid gas were reacted in the presence of ultrafine bubbles (submicron bubbles) containing carbonic acid gas according to the present invention, inorganic particles of 60 nm or less deposited on the surface of the pulp fiber, whereby inorganic particles/pulp fiber complexes could be synthesized (Sample 4-1).

For comparison, cavitation bubbles were generated using a cavitation system (a large system) as shown in FIG. 6 during the reaction between the suspension and carbonic acid gas (the cavitation bubbles had an average particle size of about 50 μm and an average bubble lifetime of about 0.1 second). In this case, magnesium carbonate having an average particle size of 130 nm also deposited on the pulp fiber (Sample 4-2), but the power consumption per production output (1 ton) was 45 times or more higher than observed with Sample 4-1.

Thus, the present invention allows magnesium carbonate/fiber complexes to be prepared very efficiently with low power consumption per unit time.

TABLE 4

The results of Experiment 4 (Synthesis of magnesium carbonate/fiber complexes)

| Number | System | Bubble average particle size | Bubble lifetime | Pressure, MPa P1 | P2 | Flow rate L/min · cm2 | Mg(OH)2 Conc. % | Carbon dioxide flow rate L/min | Reaction period min | Primary particle size nm | Average particle size nm | Power consumption per output kwh/t |
|---|---|---|---|---|---|---|---|---|---|---|---|---|
| 4-1 | YJ-9 | 137 | ≥60 min | 2.0 | 0.1 | 125 | 1 | 20 | 15 | 40-60 | 50 | 0.15 |
| 4-2 | Large CV | 50 μm | 0.1 sec | 7.0 | 0.3 | 637 | 1 | 20 | 11 | 100-150 | 130 | 6.75 |

The invention claimed is:

1. A process for preparing an inorganic carbonate, comprising generating ultrafine bubbles containing carbonic acid gas by injecting a gas containing the carbonic acid gas and a liquid into a reaction vessel through a nozzle to deposit the inorganic carbonate having an average primary particle size of 300 nm or less in the presence of the ultrafine bubbles,
wherein the ultrafine bubbles have an average particle size of 1 to 300 nm,
the inorganic carbonate is calcium carbonate or magnesium carbonate, and
the gas containing the carbonic acid gas and the liquid are emitted from the nozzle at a flow rate of 100 to 640 L/min per cm$^2$.

2. The process of claim 1, wherein an average duration from a generation of the ultrafine bubbles to a disappearance of the ultrafine bubbles is 10 seconds or more.

3. The process of claim 2, wherein the inorganic carbonate is calcium carbonate.

4. A process for preparing an inorganic carbonate and fiber complex using the process of claim 3, and further comprising depositing the inorganic carbonate on a fiber in the presence of the fiber.

5. The process of claim 4, wherein the fiber is a cellulose fiber.

6. The process of claim 2, wherein the inorganic carbonate is magnesium carbonate.

7. A process for preparing an inorganic carbonate and fiber complex using the process of claim 6, and further comprising depositing the inorganic carbonate on a fiber in the presence of the fiber.

8. The process of claim 7, wherein the fiber is a cellulose fiber.

9. A process for preparing an inorganic carbonate and fiber complex using the process of claim 1, and further comprising depositing the inorganic carbonate on a fiber in the presence of the fiber.

10. The process of claim 9, wherein the fiber is a cellulose fiber.

11. The process of claim 1, wherein the inorganic carbonate is calcium carbonate.

12. A process for preparing an inorganic carbonate and fiber complex using the process of claim 11, and further comprising depositing the inorganic carbonate on a fiber in the presence of the fiber.

13. The process of claim 12, wherein the fiber is a cellulose fiber.

14. The process of claim 1, wherein the inorganic carbonate is magnesium carbonate.

15. A process for preparing an inorganic carbonate and fiber complex using the process of claim 14, and further comprising depositing the inorganic carbonate on a fiber in the presence of the fiber.

16. The process of claim 15, wherein the fiber is a cellulose fiber.

17. The process of claim 1 wherein the gas containing the carbonic acid gas and the liquid are emitted from the nozzle at a flow rate of 100 to 300 L/min per cm$^2$.

18. The process of claim 1, wherein an average duration from a generation of the ultrafine bubbles to a disappearance of the ultrafine bubbles is 60 minutes or more.

* * * * *